US008665255B2

United States Patent
Tsujino et al.

(10) Patent No.: US 8,665,255 B2
(45) Date of Patent: Mar. 4, 2014

(54) POWER SUPPLY CIRCUIT AND DISPLAY DEVICE INCLUDING THE SAME

(75) Inventors: Sachio Tsujino, Osaka (JP); Shuji Nishi, Osaka (JP); Yuhichiroh Murakami, Osaka (JP); Yasushi Sasaki, Osaka (JP); Seijirou Gyouten, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1017 days.

(21) Appl. No.: 12/733,813

(22) PCT Filed: Jul. 24, 2008

(86) PCT No.: PCT/JP2008/063234
§ 371 (c)(1),
(2), (4) Date: Mar. 22, 2010

(87) PCT Pub. No.: WO2009/063661
PCT Pub. Date: May 22, 2009

(65) Prior Publication Data
US 2010/0245327 A1    Sep. 30, 2010

(30) Foreign Application Priority Data

Nov. 13, 2007   (JP) .................................. 2007-293920

(51) Int. Cl.
*G09G 5/00*    (2006.01)
(52) U.S. Cl.
USPC ........... 345/211; 345/204; 345/213; 345/690; 323/220; 323/271; 323/282
(58) Field of Classification Search
USPC .................. 345/204, 211–213; 327/536, 540; 323/282, 222, 223, 225, 271, 285
See application file for complete search history.

(56) References Cited

U.S. PATENT DOCUMENTS

| 5,521,547 A | 5/1996 | Tsukada |
| 5,774,012 A | 6/1998 | Im |

(Continued)

FOREIGN PATENT DOCUMENTS

| JP | 06-014529 | 1/1994 |
| JP | 9-154274 | 6/1997 |

(Continued)

OTHER PUBLICATIONS

Office Action for corresponding U.S. Appl. No. 12/734,394 dated Mar. 7, 2012.
Notice of Allowance for corresponding U.S. Appl. No. 12/734,394 dated Jul. 9, 2012.
International Search Report.

(Continued)

*Primary Examiner* — Jennifer Nguyen
(74) *Attorney, Agent, or Firm* — Harness, Dickey & Pierce, P.L.C.

(57) ABSTRACT

An object of the present invention is to provide a power supply circuit including a charge-pumping booster section which uses switching elements provided only by N-channel transistors yet does not have a problem of voltage drop by threshold value. In a booster section (11a), capacitors (C1) and (C2) have their respective first terminals connected with transistors (Q1, Q3) and (Q2, Q4) respectively. Each transistor has its gate terminal supplied with control signals generated in a driver section (11b). The driver section (11b) includes capacitors (C3, C4) connected with input terminals (Ti3, Ti4) for respective supply of clock signals DCK2, DCK2B each having a voltage alternating between −VDD and VDD (VDD represents an input supply voltage from outside), as level-shifted signals of clock signals DCK1, DCK1B which are supplied to second terminals of the capacitors (C1, C2) respectively. In this arrangement, the driver section 11b generates signals each having a voltage alternating between VDD and 3VDD, as the control signals.

13 Claims, 13 Drawing Sheets

(56) References Cited

U.S. PATENT DOCUMENTS

| | | | |
|---|---|---|---|
| 6,107,863 A * | 8/2000 | Iwata | 327/536 |
| 6,605,985 B2 | 8/2003 | Pagliato et al. | |
| 7,432,757 B2 * | 10/2008 | Kimura | 327/537 |
| 7,436,241 B2 | 10/2008 | Chen et al. | |
| 7,855,591 B2 | 12/2010 | Racape | |
| 2004/0027102 A1 | 2/2004 | Kim | |
| 2007/0040825 A1 | 2/2007 | Mamba et al. | |
| 2008/0122812 A1 * | 5/2008 | Park et al. | 345/204 |

FOREIGN PATENT DOCUMENTS

| | | |
|---|---|---|
| JP | 10-285911 | 10/1998 |
| JP | 2002-008385 | 1/2002 |
| JP | 2004-096987 | 3/2004 |
| JP | 2006-042015 | 2/2006 |
| JP | 2007-060732 | 3/2007 |

* cited by examiner (A)

(B)

(A)

(B)

POWER SUPPLY CIRCUIT AND DISPLAY DEVICE INCLUDING THE SAME

TECHNICAL FIELD

The present invention relates to power supply circuits, and more specifically to a power supply circuit which includes a charge-pumping booster section for boosting a supply voltage, and to a driver monolithic display device which includes such a power supply circuit.

BACKGROUND ART

Inductance DC-DC converters for boosting supply voltages are already public. A challenge with this type of DC-DC converters, however, is size reduction since the converter requires inductive elements, and it has long been difficult to implement the converter as a semiconductor circuit. For this reason, when supply voltage boosting is required in portable equipment such as mobile telephone terminals or in integrated circuits, the task is accomplished by charge pump circuits (see Patent Document 1 (JP-A Hei 10-285911 Gazette), for example) which are built with capacitors and switching elements.

In liquid crystal display devices incorporated in mobile telephone terminals for example, a charge pump circuit is utilized in order to generate voltages (to be applied to scanning signal lines for example) to drive the liquid crystal display devices. In cases where such a liquid crystal display device includes thin film transistors (hereinafter abbreviated as "TFT") provided by MOS (Metal Oxide Semiconductor) transistors made of polycrystal silicon, as constituent elements in individual pixel circuits, the charge pump circuit is sometimes formed together with these pixel circuits on the same insulation substrate which is provided by e.g. a glass substrate (see Patent Document 2 (JP-A 2007-60732 Gazette) for example).

Patent Document 1: JP-A Hei 10-285911 Gazette
Patent Document 2: JP-A 2007-60732 Gazette

DISCLOSURE OF THE INVENTION

Problems to be Solved by the Invention

Switching elements for constituting a charge pump circuit are often provided by field effect transistors such as MOS transistors manufactured from monocrystal silicon or polycrystal silicon. In view of manufacturing cost, use of only one type of field effect transistor, i.e. one which has an N-type conductivity channel region or the other which has a P-type conductivity channel region, is preferred.

Also, in active matrix display devices in which display images are formed by a plurality of pixel circuits formed on an insulated substrate (typically on a glass substrate), TFTs of only one type of conductivity channel region, i.e. N-type or P-type, are used as switching elements in individual pixel circuits. Because of this, if at least part of a circuit which drives these pixel circuits is formed on the same insulated substrate using the same manufacturing process as for the TFTs which are formed in the individual pixel circuits, use of the same type of TFT is preferred. Specifically, incases of driver monolithic display devices, it is preferable that switching elements in the drive circuit formed on the above-described insulated substrate be provided by TFTs which have the same type of conductivity channel region as the other switching elements used in the pixel circuits. For example, when using an N-channel TFT as the switching element in each pixel circuit, it is preferable that only N-channel TFTs are employed as the switching elements in the drive circuit to be formed on the same insulated substrate. Further, in this case, if a charge pump circuit is also formed on the same substrate in the same manufacturing process, it is preferable that only N-channel TFTs are employed as the switching elements in the charge pump circuit, too.

However, such an arrangement that the switching elements in a booster charge pump circuit are solely provided by N-channel transistors (MOS transistor, TFT or the like) has a problem. Specifically, when an electrical charge passes through an ON-state N-channel transistor, there is a voltage drop across the input side of the N-channel transistor and the output side thereof, by an amount just as large as a threshold voltage of the N-channel transistor (this phenomenon is called "voltage drop by threshold value"). Where it happens, the charge pump circuit cannot boost the supply voltage to the target voltage. Hereinafter, this point is elaborated using FIG. 23 which shows a conventional charge pump circuit disclosed in Patent Document 1 (JP-A Hei 10-285911 Gazette), as an example.

This conventional charge pump circuit includes: a main pump which is provided by a booster section 51a composed of N-channel transistors (N-channel MOS transistors) Q1 through Q4 serving as switching elements, and capacitors C1, C2; and a sub pump provided by a driver section 51b composed of N-channel transistors (N-channel MOS transistors) Q5, Q6 serving as switching elements, and capacitors C3, C4. The circuit has a first and a second input terminals Ti1, Ti2, an output terminal To, and a power supply terminal Tdd. The N-channel transistors Q1 through Q6, the capacitors C1 through C4, the first and the second input terminals Ti1, Ti2, the output terminal To, and the power supply terminal Tdd which constitute the booster section 51a and the driver section 51b are connected as shown in FIG. 23. The power supply terminal Tdd is supplied with a 5[V] supply voltage VDD, the first input terminal Ti1 is supplied with a first clock signal DCK1 shown in FIG. 24 and the second input terminal Ti2 is supplied with a second clock signal DCK1B shown in FIG. 24. As shown in FIG. 24, the first, clock signal DCK1 and the second clock signal DCK1B are pulse signals each having a voltage alternating oppositely to each other between 0[V] and 5[V] (=VDD). Based on the first and the second clock signals DCK1, DCK1B as the above, the supply voltage VDD is boosted to twice as high by using the capacitors C1, C2, and the doubled voltage is outputted as a boosted supply voltage, from the output terminal To via the N-channel transistor Q1 or Q2.

In FIG. 23, each of the N-channel transistors Q1 through Q6 is marked with a circle or a cross drawn in broken lines. The circle in broken line indicates that the transistor marked therewith is in ON state whereas the cross in broken line indicates that the transistor marked therewith is in OFF state. Also, a number or a mathematical expression at each point of connection indicates a voltage at the connecting point. With such circles and crosses drawn in broken lines, and numbers and mathematical expressions, FIG. 23(A) shows a state where the first clock signal DCK1 has a voltage of 0[V] while the second clock signal DCK1B has a voltage of 5[V] (namely, during Time Period A in FIG. 24), with an indication of the ON/OFF state for each of the N-channel transistors Q1 through Q6 and a voltage at each point of connection. FIG. 23(B) shows a state where the first clock signal DCK1 has a voltage of 5[V] while the second clock signal DCK1B has a voltage of 0[V] (namely, during Time Period B in FIG. 24), with an indication of the ON/OFF state for each of the N-channel transistors Q1 through Q6 and a voltage at each point of connection. Reference symbols "s", "d" and "g" in FIG. 23 indicate a source terminal, a drain terminal and a gate terminal in each of the transistors Q1 through Q6.

In its steady-state operation, this charge pump circuit repeats an operation in Time Period A in which the circuit assumes the state shown in FIG. 23(A) and an operation in Time Period B in which the circuit assumes the state shown in FIG. 23(B), alternately to each other. In Time Period A, the driver section 51b supplies a voltage of 10[V] to the gate terminals of the N-channel transistors Q2, Q3 as control signals and a voltage of 5[V] to the gate terminals of the N-channel transistors Q1, Q4 as control signals whereas in Time Period B, the driver section 51b supplies a voltage of 5[V] to the N-channel transistors Q2, Q3 as control signals and a voltage of 10[V] to the gate terminals of the N-channel transistors Q1, Q4 as control signals. As a result, the capacitor C1 has its first terminal supplied with the supply voltage VDD (=5[V]) thereby being charged during Time Period A (with the second terminal of the capacitor C1 being supplied with 0[V]), whereas in Time Period B, the second terminal is supplied with the first clock signal DCK1 of 5[V], and therefore the first terminal of the capacitor C1 has a voltage of 10[V]. Likewise, the capacitor C2 has its first terminal supplied with the supply voltage VDD (=5[V]) thereby being charged during Time Period B (with the second terminal of the capacitor C2 being supplied with 0[V]) whereas in Time Period A, the second terminal is supplied with the second clock signal DCK1B of 5[V], and therefore the first terminal of the capacitor C2 then has a voltage of 10[V]. The 10[V] voltage thus obtained is outputted through the N-channel transistor Q2 and then from the output terminal To in Time Period A as a boosted supply voltage whereas in Time Period B, the voltage is outputted through the N-channel transistor Q1 and then from the output terminal To.

However, the voltage which is supplied to the gate terminal of N-channel transistor Q2 in Time Period A and the voltage which is supplied to the gate terminal of N-channel transistor Q1 in Time Period B are both 10[V], i.e. equal to the source terminal voltage of the transistors Q1, Q2, and this results in a voltage drop by threshold value. Consequently, the voltage which is actually outputted from the output terminal To is lower than 10[V] by a threshold voltage Vth of the N-channel transistors Q1, Q2, i.e. 10−Vth[V] (see FIG. 23(A) and FIG. 23(B)).

As described thus far, if switching elements used in a charge pump circuit are provided solely by N-channel transistors, boosting to the target voltage is impossible due to the voltage drop by threshold value. The voltage drop by threshold value is particularly a problem in cases where the switching elements in the charge pump circuit are provided by TFTs each of which is a type of MOS transistor, since the TFT has a relatively large threshold value and the threshold value varies relatively widely. If the threshold voltage is decreased in an attempt to achieve voltage boosting as closely as to the target voltage, the MOS transistors allow charge backflow when they are supposed to be in OFF state, making it impossible to perform stable boosting.

It is therefore an object of the present invention to provide a power supply circuit including a charge-pumping booster section which uses switching elements provided solely by N-channel transistors yet does not have the problem of voltage drop by threshold value. Another object of the present invention is to provide a driver monolithic display device including such a power supply circuit.

Means for Solving the Problems

A first aspect of the present invention provides a charge-pumping power supply circuit for booting an input supply voltage from outside. The circuit includes:

a booster section including a charging capacitor and an input-side and an output-side switching elements connected with a first terminal of the charging capacitor, for boosting a voltage supplied to the charging capacitor via the input-side switching element and outputting a boosted voltage as a boosted supply voltage via the output-side switching element; and a driver section for generating control signals for the input-side and the output-side switching elements to turn on and off oppositely to each other;

wherein each of the input-side and the output-side switching elements is provided by an N-channel transistor of a positive threshold voltage, and wherein the driver section generates the control signals so that the control signal for the output-side switching element to turn on has a voltage higher than the boosted voltage by at least the threshold voltage.

A second aspect of the present invention provides the power supply circuit according to the first aspect of the present invention. This power supply circuit further includes a level shifter supplied with a first and a second clock signals each having a same amplitude as the other and a voltage alternating oppositely to each other, for respectively converting the first and second clock signals into a third and a fourth clock signals each having a greater amplitude than the first and second clock signals by at least the threshold voltage, wherein the charging capacitor has a second terminal supplied with the first clock signal, and wherein the driver section generates, based on the third and the fourth clock signals, two respective pulse signals each having a same phase as the first and the second clock signals and a voltage alternating oppositely to each other between the input supply voltage and a voltage which is greater than the input supply voltage by the amplitude of the third and the fourth clock signals, as a first and a second switching control signals constituting the control signals.

A third aspect of the present invention provides the power supply circuit according to the first aspect of the present invention. In this power supply circuit, the booster section includes:

a power supply terminal for receiving the input supply voltage;

a first and a second input terminals for respectively receiving a first and a second clock signals each having a same amplitude as the other and a voltage alternating oppositely to each other;

an output terminal for outputting the boosted supply voltage;

a first and a second switching elements each serving as the output-side switching element which is provided by an N-channel transistor;

a third and a fourth switching elements each serving as the input-side switching element which is provided by an N-channel transistor;

a first capacitor serving as the charging capacitor, having a first terminal connected with the power supply terminal via the third switching element as well as with the output terminal via the first switching element, and a second terminal connected with the first input terminal; and a second capacitor serving as the charging capacitor, having a first terminal connected with the power supply terminal via the fourth switching element as well as with the output terminal via the second switching element, and a second terminal connected with the second input terminal; and the driver section includes:

a third and a fourth input terminals for respectively receiving a third and a fourth clock signals each having a same amplitude as the other and a voltage alternating oppositely to each other;

a fifth and a sixth switching elements provided by N-channel transistors;

a third capacitor having a first terminal connected with the power supply terminal via the fifth switching element as well as with a control terminal of the sixth switching element, and a second terminal connected with the third input terminal; and a fourth capacitor having a first terminal connected with the power supply terminal via the sixth switching element as well as with a control terminal of the fifth switching element, and a second terminal connected with the fourth input terminal;

wherein a voltage at the first terminal of the third capacitor is supplied to control terminals of the first and the fourth switching elements as a first switching control signal constituting the control signals, a voltage at the first terminal of the fourth capacitor being supplied to control terminals of the second and the third switching elements as a second switching control signal constituting the control signals.

A fourth aspect of the present invention provides the power supply circuit according to the third aspect of the present invention. This power supply circuit further includes a level shifter for converting the first and the second clock signals into respective clock signals each having a greater amplitude than the respective first and second clock signals by at least the threshold voltage. With the above arrangement, the level shifter outputs the converted clock signals as the third and the fourth clock signals.

A fifth aspect of the present invention provides the power supply circuit according to the fourth aspect of the present invention. In this power supply circuit, the level shifter converts the first and the second clock signals into respective clock signals each having a voltage alternating oppositely to each other between a negative voltage and a positive voltage each having a same absolute value as the amplitude of the first and second clock signals with respect to a grounding voltage as a reference potential for the input supply voltage. With the above arrangement, the level shifter outputs the converted clock signals as the third and the fourth clock signals, the first and the second clock signals each have a voltage alternating between the input supply voltage and the grounding voltage, and the third and the fourth clock signals each have a voltage alternating between a negative voltage and a positive voltage each having a same absolute value as the input supply voltage.

A sixth aspect of the present invention provides the power supply circuit according to the fifth aspect of the present invention. This power supply circuit further includes a negative-side power supply circuit including the level shifter, for outputting as a negative supply voltage a negative voltage which has a same absolute value as the input supply voltage. The negative-side power supply circuit includes:

a grounding terminal for receiving the grounding voltage;

a negative output terminal for outputting the negative supply voltage;

a first and a second clock output terminals;

seventh through twelfth switching elements provided by N-channel transistors;

a fifth capacitor having a first terminal connected with the grounding terminal via the ninth switching element, as well as with the negative output terminal via the seventh switching element, and with the first clock output terminal via the eleventh switching element; and a second terminal connected with the first input terminal and with a control terminal of the twelfth switching element;

a sixth capacitor having a first terminal connected with the grounding terminal via the tenth switching element, as well as with the negative output terminal via the eighth switching element, and with the second clock output terminal via the twelfth switching element; and a second terminal connected with the second input terminal and with a control terminal of the eleventh switching element;

a first resistive element having a first terminal connected with the first clock output terminal, a control terminal of the eighth switching element and a control terminal of the ninth switching element; and a second terminal connected with the power supply terminal; and a second resistive element having a first terminal connected with the second clock output terminal, a control terminal of the seventh switching element, and a control terminal of the tenth switching element; and a second terminal connected with the power supply terminal. In the above arrangement, the ninth, the tenth, the eleventh and the twelfth switching elements, the fifth and the sixth capacitors, and the first and the second resistive elements constitute the level shifter, and voltages at the first and the second clock output terminals are supplied to the third and the fourth input terminals as the third and the fourth clock signals respectively.

A seventh aspect of the present invention provides the power supply circuit according to the first aspect of the present invention. In this power supply circuit, the switching elements in the booster section and the driver section are made of a polycrystal silicon.

An eighth aspect of the present invention provides the power supply circuit according to the first aspect of the present invention. In this power supply circuit, the switching elements in the booster section and the driver section are provided by N-channel thin film transistors.

A ninth aspect of the present invention provides a driver monolithic display device, in which a plurality of pixel circuits for formation of an image intended to display and at least part of a circuit for driving the pixel circuits are both formed on one substrate. The display device includes:

a display section including the pixel circuits;

the power supply circuit according to one of the first through the eighth aspects; and a drive circuit which receives the boosted supply voltage from the power supply circuit and drives the display section;

wherein the substrate is formed thereon with the pixel circuits, at least part of the drive circuit and the power supply circuit.

A tenth aspect of the present invention provides the driver monolithic display device according to the ninth aspect of the present invention. In this display device, switching elements in the pixel circuits, said at least part of the drive circuit and the power supply circuit formed on the substrate are each provided by an N-channel thin film transistor.

Advantages of the Invention

According to the first aspect of the present invention, when a boosted voltage obtained at the first terminal of the charging capacitor is outputted as a boosted supply voltage via the output-side switching element by turning ON the output-side switching element which is provided by a N-channel transistor, the N-channel transistor's control terminal (gate terminal) is supplied with a voltage which is higher than the boosted voltage by at least the threshold voltage of the N-channel transistor. Hence, the N-channel transistor does not have a voltage drop by threshold value, so the boosted voltage is intact when it is outputted as the boosted supply voltage. Therefore, even if the switching elements are solely provided by N-channel transistors, it is now possible to provide a power supply circuit which is capable of outputting a desired boosted supply voltage reliably without being affected by threshold values or variations thereof. The configuration which uses switching elements solely provided by N-channel transistors provides a way to reduce cost through a simplified process of manufacture than necessary for configurations which require both of N-channel transistors and P-channel transistors.

According to the second aspect of the present invention, the first clock signal supplied to the second terminal of the charging capacitor produces, at the first terminal of this charging capacitor, a voltage which is higher than the input supply voltage by the amount of an amplitude of the first clock signal. On the other hand, the level shifter produces the third and the fourth clock signals which have a greater amplitude than the first and the second clock signals by at least the threshold voltage of the N-channel transistor. Based on these third and fourth clock signals, the driver section generates two respective pulse signals each having the same phase as the first and the second clock signals and a voltage alternating oppositely to each other between the input supply voltage and a voltage which is higher than the input supply voltage by the amplitude of the third and the fourth clock signals, as a first and a second switching control signals. Thus, when the output-side switching element provided by a N-channel transistor is turned ON, the voltage which is supplied to the transistor's control terminal is higher than a sum of the input supply voltage and the amplitude of the first and the second clock signal (boosted voltage) by at least the threshold voltage. Hence, the N-channel transistor serving as the output-side switching element does not have a voltage drop by threshold value, so the boosted voltage obtained at the first terminal of the charging capacitor, namely, the voltage which is higher than the input supply voltage by the amount of amplitude of the first clock signal, is intact when it is outputted as the boosted supply voltage. Therefore, even if the switching elements are solely provided by N-channel transistors, the power supply circuit is capable of outputting a desired boosted supply voltage reliably without being affected by the N-channel transistor's threshold value or variations thereof.

It should be noted here that in cases where the first and the second clock signals are supplied as two pulse signals each having the same amplitude as the input supply voltage and the voltage alternating oppositely to each other, only one power supply for the input supply voltage is enough as the external power supply in order to drive a power supply circuit according to the second aspect of the present invention, and the arrangement enables to obtain a desired boosted supply voltage reliably without being affected by the N-channel transistor's threshold value or variations thereof.

According to the third aspect of the present invention, the first capacitor and the second capacitor perform charging and boosting alternately to each other and in a complementary manner to each other. In other words, in one operation state, a boosted voltage obtained at a terminal of the first capacitor is outputted via the first switching element, and in another operation state, a boosted voltage obtained at a terminal of the second capacitor is outputted via the second switching element, and these two operation states are repeated alternately to each other. While one of the first and the second capacitors is boosting a voltage, the other of the two is being charged.

Such a complementary boosting cycle makes it possible to improve electric current supply capability to a load.

Also, when turning ON the first and the second switching elements which serve as the output-side switching elements, the control terminals of these switching elements are supplied with the first and the second switching control signals which have a higher voltage than the input supply voltage by the amplitude of the third and the fourth clock signals. On the other hand, the boosted voltage obtained at a terminal of the first and the second capacitors is higher than the input supply voltage by the amplitude of the first and the second clock signal. Therefore, it is possible to avoid a voltage drop by threshold value in the output-side switching element, by supplying the third and the fourth input terminals with the third and the fourth clock signals which have a greater amplitude than the first and the second clock signals by at least the N-channel transistor's threshold voltage. Hence, according to the third aspect of the present invention, the power supply circuit is capable of supplying a desired boosted supply voltage reliably without being affected by N-channel transistor's threshold value or variations thereof, even though all switching elements used in the booster section and the driver section are provided by N-channel transistors.

According to the fourth aspect of the present invention, the third and the fourth input terminals are supplied with the third and the fourth clock signals which have a greater amplitude than the first and the second clock signals by at least the threshold voltage of the N-channel transistors when outputted from the level shifter. Thus, when turning ON the first and the second switching elements which serve as the output-side switching elements, the control terminals of these switching elements are supplied with the first and the second switching control signals which have a higher voltage than a sum of the input supply voltage and the amplitude of the first and the second clock signals by at least the threshold voltage of the N-channel transistors. As a result, the boosted voltage has a value equal to the sum of the input supply voltage and the amplitude of the first and the second clock signals, which is then outputted as the boosted supply voltage without a voltage drop by threshold value.

According to the fifth aspect of the present invention, the first and the second clock signals have a voltage alternating to each other between the input supply voltage and the grounding voltage. With the supply of these signals, the level shifter outputs the third and the fourth clock signals which have a voltage alternating to each other between a negative voltage and a positive voltage each having the same absolute value as the input supply voltage. Based on these third and fourth clock signals, when turning ON the first and the second switching elements which serve as the output-side switching elements, the control terminals of these switching elements are supplied with the first and the second switching control signals which have a threefold voltage of the input supply voltage. As a result, the boosted voltage has a twofold voltage of the input supply voltage, which is then outputted as the boosted supply voltage without a voltage drop by threshold value. Further, since the first and the second clock signals have a voltage alternating oppositely to each other between the input supply voltage and the grounding voltage, only one power supply for the input supply voltage is enough as the external power supply.

According to the sixth aspect of the present invention, the first and the second input terminals are respectively supplied with the first and the second clock signals which have a voltage alternating to each other between the input supply voltage and the grounding voltage. Based on these first and second clock signals, the negative-side power supply circuit generates and, outputs the third and the fourth clock signals which have a voltage alternating to each other between a negative voltage and a positive voltage each having the same absolute value as the input supply voltage. In addition, the negative-side power supply circuit outputs a negative voltage which has the same absolute value as the input supply voltage as a negative supply voltage. Therefore, the sixth aspect of the present invention provides the same advantages as offered by the fifth aspect of the present invention, and in addition, provides a negative supply voltage, which offers an additional advantage for those electronic devices which require both of a boosted supply voltage and a negative supply voltage.

According to the seventh aspect of the present invention, since there is no voltage drop by threshold value even if the switching elements are solely provided by N-channel transistors, it is possible to form a power supply circuit which is capable of outputting a desired boosted supply voltage reliably, on an insulated substrate such as a glass substrate, using N-channel transistors made of polycrystal silicon whose threshold value is higher and variation thereof is wider than those made of monocrystal silicon.

According to the eighth aspect of the present invention, since there is no voltage drop by threshold value even if the switching elements are solely provided by N-channel transistors, it is possible to form a power supply circuit which is capable of outputting a desired boosted supply voltage reliably, on an insulated substrate such as a glass substrate, using N-channel transistors provided by thin film transistors whose threshold value is higher and variation thereof is wider than those made of monocrystal silicon.

According to the ninth aspect of the present invention, a driver monolithic display device includes a substrate formed thereon with a voltage boosting power supply circuit together with a plurality of pixel circuits and at least part of a driving circuit. In this configuration, the power supply circuit uses N-channel transistors for all of its switching elements, and yet is capable of outputting a desired boosted supply voltage reliably without a voltage drop by threshold value. Thus, the present invention enables size reduction of display devices and cost reduction in the manufacture thereof.

According to the tenth aspect of the present invention, a driver monolithic display device includes a substrate formed thereon with a voltage boosting power supply circuit together with a plurality of pixel circuits and at least part of a driving circuit. In this configuration, the power supply circuit is capable of outputting a desired boosted supply voltage reliably without a voltage drop by threshold value. Further, switching elements constituting these pixel circuits, the part of driving circuit and the power supply circuit which are formed on the same substrate are solely provided by N-channel thin film transistors. This enables simultaneous formation of these circuits to be achieved through a fewer number of manufacturing steps than necessary for cases which require both N-channel thin film transistors and P-channel thin film transistors, which thereby enables cost reduction.

LEGEND

Figure 1:
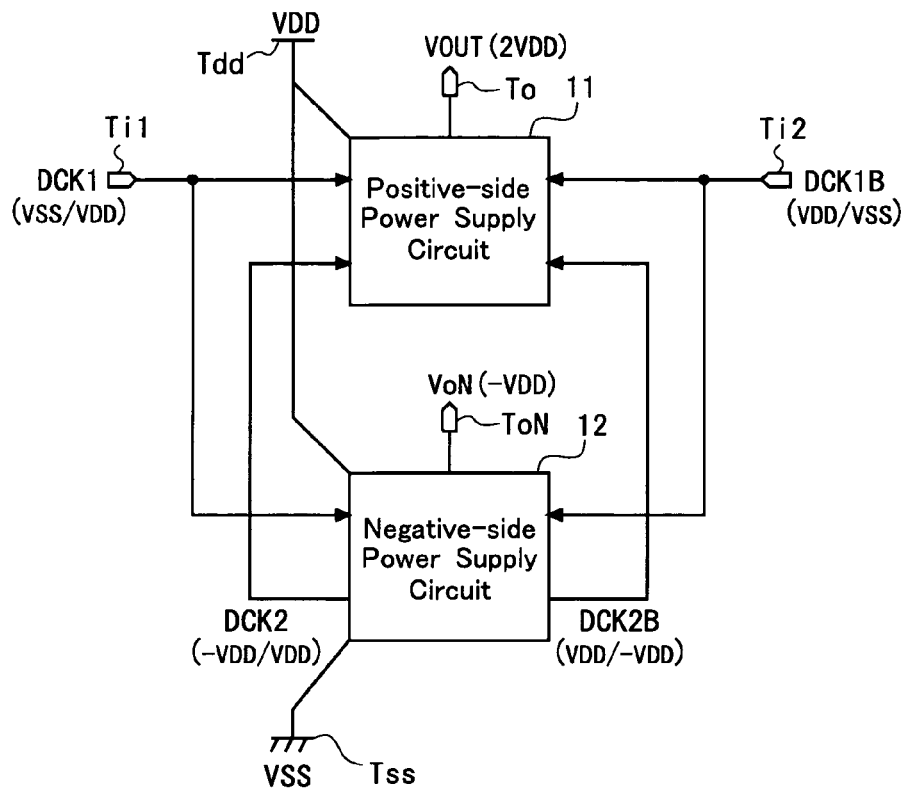
FIG. 1 is a block diagram which shows a general configuration of a power supply circuit according to an embodiment of the present invention.

10 Thin film transistor (TFT)
11 Positive-side power supply circuit
11a Booster section
11b Driver section
12 Negative-side power supply circuit
14 Level shifter
100 Liquid crystal panel
110 Pixel array
120 Source driver (data signal line drive circuit)
130 Gate driver (scanning signal line drive circuit)
140 CS driver (auxiliary capacity line drive circuit)
150 Power supply section
200 Display control circuit
Ti1 First input terminal
Ti2 Second input terminal
Ti3 Third input terminal
Ti4 Fourth input terminal
To Output terminal
ToN Negative output terminal Tdd Power supply terminal
Tss Grounding terminal
Tco1 First clock output terminal
Tco2 Second clock output terminal
Q1 through Q12 First through twelfth N-channel transistors
C1 through C6 First through sixth capacitors
R1, R2 First and Second resistive elements
DCK1, DCK1B First and second clock signals
DCK2, DCK2B Third and fourth clock signals
CG1, CG2 First and second switching control signals
VDD Supply voltage (Input supply voltage)
VSS Grounding voltage
VOUT Boosted supply voltage
VoN Negative supply voltage
Scpw Power supply control signals
VPW1 through VPW4 Supply voltages

BEST MODE FOR CARRYING OUT THE INVENTION

Hereinafter, an embodiment of the present invention will be described with reference to the attached drawings.

<1. Configuration>

FIG. 1 is a block diagram which shows a general configuration of a power supply circuit according to an embodiment of the present invention. This power supply circuit includes: a positive-side power supply circuit 11 which functions as a charge-pumping voltage-boosting power supply circuit; and a negative-side power supply circuit 12 which generates a negative supply voltage; and has external terminals including: a first and a second input terminals Ti1 and Ti2 for receiving externally supplied first and second clock signals DCK1 and DCK1B respectively; a power supply terminal Tdd for receiving a positive supply voltage VDD as an input supply voltage from outside; a grounding terminal Tss which is connected to an external grounding line and receives a grounding voltage VSS as a reference potential for the input supply voltage; an output terminal To for outputting a boosted voltage VOUT (=2VDD); and a negative output terminal for outputting a generated negative supply voltage VoN (=–VDD).

Figure 2:
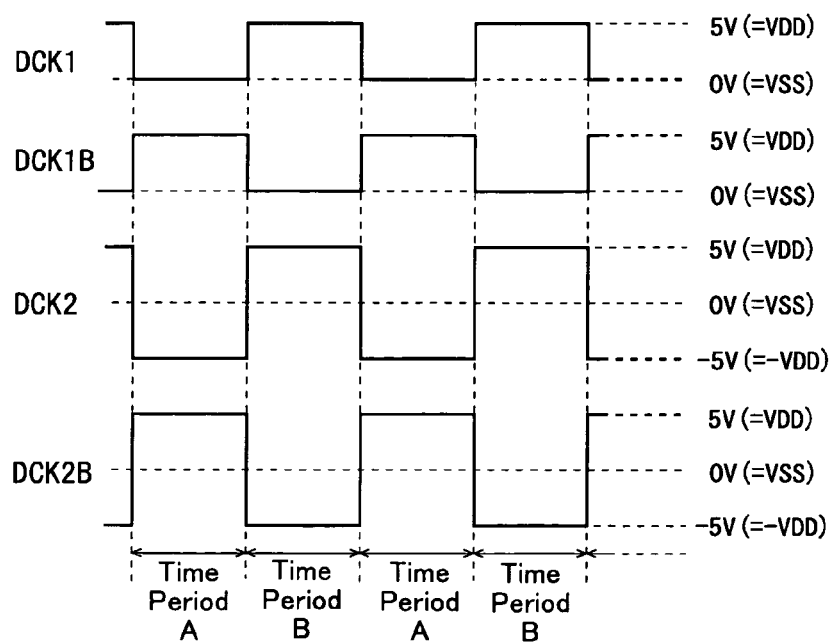
FIG. 2 is a waveform chart of clock signals for driving a positive-side power supply circuit in the embodiment.

The positive-side power supply circuit 11 receives: two external pulse signals each having a voltage alternating oppositely to each other between the supply voltage VDD and the grounding voltage VSS, as a first and a second clock signals DCK1, DCK1B; and two pulse signals each having a voltage alternating oppositely to each other between the supply voltage VDD and a negative voltage (–VDD) which has the same absolute value as the supply voltage VDD, as a third and a fourth clock signals DCK2, DCK2B from the negative-side power supply circuit 12. FIG. 2 is a signal waveform chart which shows these first through the fourth clock signals DCK1, DCK1B, DCK2 and DCK2B. Using these first through the fourth clock signals DCK1, DCK1B, DCK2 and DCK2B, the positive-side power supply circuit 11 doubles the supply voltage VDD from outside and outputs the boosted voltage 2VDD as a boosted supply voltage VOUT, from the output terminal To.

The negative-side power supply circuit 12 uses the first and the second clock signal DCK1, DCK1B and generates: the third and the fourth clock signals DCK2, DCK2B to be supplied to the positive-side power supply circuit 11; and a negative voltage which has the same absolute value as the supply voltage VDD. The generated negative voltage (–VDD) is outputted as the negative supply voltage VoN, from the negative output terminal ToN.

Figure 3:
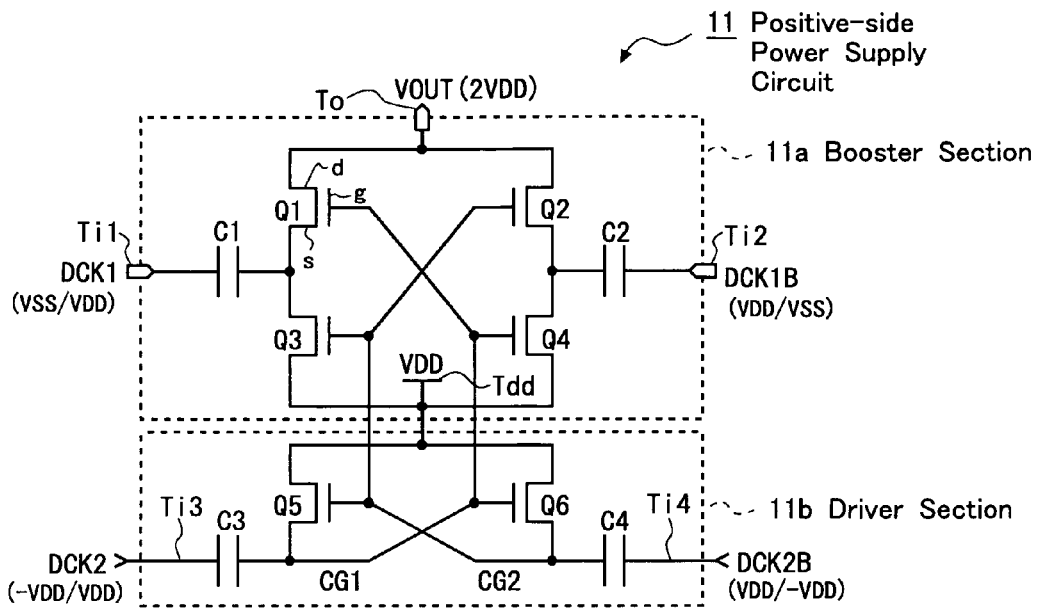
FIG. 3 is a circuit diagram which shows a configuration of the positive-side power supply circuit in the embodiment.
Figure 4:
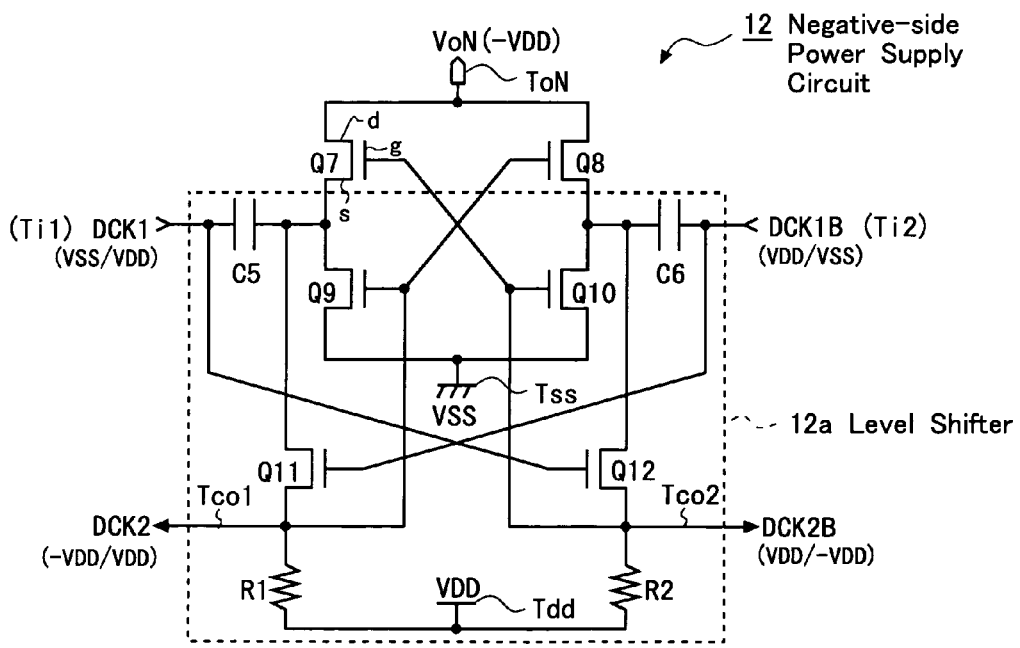
FIG. 4 is a circuit diagram which shows configuration of a negative-side power supply circuit in the embodiment.

FIG. 3 is a circuit diagram which shows a configuration of the positive-side power supply circuit 11. FIG. 4 is a circuit diagram which shows a configuration of the negative-side power supply circuit 12. As shown in FIG. 3 and FIG. 4, the power supply circuit according to the present embodiment uses N-channel transistors Q1 through Q12 as switching elements; in other words, no P-channel transistors are employed. In the configuration given in FIG. 3 and FIG. 4, the N-channel switching elements are provided by MOS (Metal Oxide Semiconductor) transistors. However, the switching elements to be used in the present embodiment are not limited to MOS transistors; in other words, the switching elements may be provided by N-channel field effect transistors of a different type as far as they are N-channel transistors which have a positive threshold voltage (hereinafter abbreviated as "N-ch transistor").

The positive-side power supply circuit 11 includes a booster section 11a which boosts the supply voltage VDD in a complementary manner using a charge-pumping principle, and a driver section 11b which generates a first and a second switching control signals CG1, CG2 for driving the booster section 11a.

The booster section 11a has the first and the second input terminal Ti1, Ti2, the power supply terminal Tdd and the output terminal To as external terminals; and in addition, the N-ch transistors Q1, Q2 as output-side switching elements; the N-ch transistors Q3, Q4 as input-side switching elements; and a first and a second capacitors C1, C2 as charging capacitors. These constituent components are connected as shown in FIG. 3. Specifically, the capacitor C1 has a first terminal, which is connected with the power supply terminal Tdd via the N-ch transistor Q3 and also connected with the output terminal To via the N-ch transistor Q1. The capacitor C1 has a second terminal, which is connected with the first input terminal Ti1. The capacitor C2 has a first terminal, which is connected with the power supply terminal Tdd via the N-ch transistor Q4 and also connected with the output terminal To via the N-ch transistor Q2. The capacitor C2 has a second terminal, which is connected with the second input terminal Ti2.

The driver section 11b includes the N-ch transistors Q5, Q6 as switching elements, a third and a fourth capacitors C3, C4 as charging capacitors, and a third and a fourth input terminals Ti3, Ti4 as internal terminals. These constituent components are connected as shown in FIG. 3.

Specifically, the capacitor C3 has a first terminal, which is connected, via the N-ch transistor Q5, with the power supply terminal Tdd, a gate terminal of the N-ch transistor Q6 and gate terminals of the N-ch transistors Q1, Q4 in the booster section 11a. The capacitor C3 has a second terminal, which is connected with the third input terminal Ti3. The capacitor C4 has a first terminal, which is connected, via the N-ch transistor Q6, with the power supply terminal Tdd, a gate terminal of the N-th transistor Q5, and gate terminals of the N-ch transistors Q2, Q3 in the booster section 11a. The capacitor C4 has a second terminal, which is connected with the fourth input terminal Ti4. Thus, a voltage at the first terminal of the capacitors C3 is supplied to the gate terminals of the N-ch transistors Q1, Q4 in the booster section 11a, as the first switching control signals CG1 whereas a voltage at the first terminal of the capacitor C4 is supplied to the gate terminals of the N-ch transistors. Q2, Q3 in the booster section 11a, as the second switching control signals CG2.

The negative-side power supply circuit 12 has the power supply terminal Tdd, the grounding terminal Tss and the negative output terminal ToN as external terminals; and in addition, includes the N-ch transistors Q7 through Q12 as switching elements, a fifth and a sixth capacitors C5, C6 as charging capacitors, a first and a second resistive elements R1, R2, and a first and a second clock output terminals Tco1, Tco2 as internal terminals. These constituent components are connected as shown in FIG. 4.

Specifically, the capacitor C5 has a first terminal, which is connected with the grounding terminal Tss via the N-ch transistor Q9, and with the negative output terminal ToN via the N-ch transistor Q7. The capacitor C5 has a second terminal, which is connected with the first input terminal Ti1 and a gate terminal of the N-ch transistor Q12. The capacitor C6 has a first terminal, which is connected with the grounding terminal Tss via the N-ch transistor Q10, and with the negative output terminal ToN via the N-ch transistor Q8. The capacitor C6 has a second terminal, which is connected with the second input terminal Ti2 and a gate terminal of the N-ch transistor Q11. Further, the first terminal of the capacitor C5 is connected with the first clock output terminal Tco1 via the N-ch transistor Q11, and the first terminal of the capacitor C6 is connected with the second clock output terminal Tco2 via the N-ch transistor Q12.

The first clock output terminal Tco1 is connected with the power supply terminal Tdd via the first resistive element R1. The second clock output terminal Tco2 is connected with the power supply terminal Tdd via the second resistive element R2. Further, the first clock output terminal Tco1 is connected directly with the third input terminal Ti3 of the driver section 11*b* in the positive-side power supply circuit 11, so the first clock output terminal Tco1 gives its voltage to the second terminal of the capacitor C3 in the driver section 11*b*, as the third clock signal DCK2. The second clock output terminal Tco2 is connected directly with the fourth input terminal Ti4 of the driver section 11*b* in the positive-side power supply circuit 11, so the second clock output terminal Tco2 gives its voltage to the second terminal of the capacitor C4 in the driver section 11*b*, as the fourth clock signal DCK2B (see FIG. 1).

<2. Operation of the Positive-Side Power Supply Circuit>

Next, reference will be made to FIG. 5 through FIG. 10 to describe an operation of the positive-side power supply circuit 11 according to the present embodiment. In FIG. 5 through FIG. 10, each of the transistors Q1 through Q6 is marked with a circle or a cross drawn in broken lines. The circle in broken line indicates the transistor marked therewith is in ON state whereas the cross in broken line indicates the transistor marked therewith is in OFF state. Also, a number or a mathematical expression at each point of connection indicates a voltage at the connecting point. Here, each connection point represents a node in a graph which only reflects a relation of connection in the circuit. Hereinafter, these connection points in the circuit may also be called "nodes". Note that the following description will be made on a premise that the supply voltage VDD is 5[V] and the grounding voltage VSS is 0[V]. In FIG. 5 through FIG. 10, each of the transistors Q1 through Q6 have their source terminals, drain terminals and gate terminals marked with respective reference symbols "s", "d" and "g". These legend and assumptions for describing the positive-side power supply circuit 11 will also be used later when describing an operation of the negative-side power supply circuit 12, and operations of variations (see FIG. 11 through FIG. 15, FIG. 19 and FIG. 20). Note also that in the following description, voltages expressed in numbers or in mathematical expressions will appear in the unit of volt but may appear without the unit symbol "[V]" where appropriate. Also, the following description will use a symbol "Vth" (Vth>0) to indicate threshold voltages of the N-ch transistors which serve as the switching elements in the circuits covered by the description.

First, consideration will be made for a state of the positive-side power supply circuit 11 before there is a supply of power. Under this state, VDD=VSS=0. The external circuits for generating the first and the second clock signals DCK1, DCK1B are not in operation, and all the nodes have a potential of 0[V]. (Assume also that none of the capacitors C1 through C4 have a charge.) Now, the present state can be expressed as follows by using the signal symbols such as "DCK1" as also indicating their potentials (or voltages based on the grounding point as a baseline) at the nodes where the signals are given:

DCK1=DCK1B=0, DCK2=DCK2B=0, VOUT=0, where DCK2 and DCK2B indicate voltages at the first and the second clock output terminals Tco1, Tco2 in the negative-side power supply circuit 12 respectively. These voltages are 0[V] in the initial state (see later description on an operation of the negative-side power supply circuit 12). In the initial state, all the transistors Q1 through Q6 are in OFF state.

Figure 5:
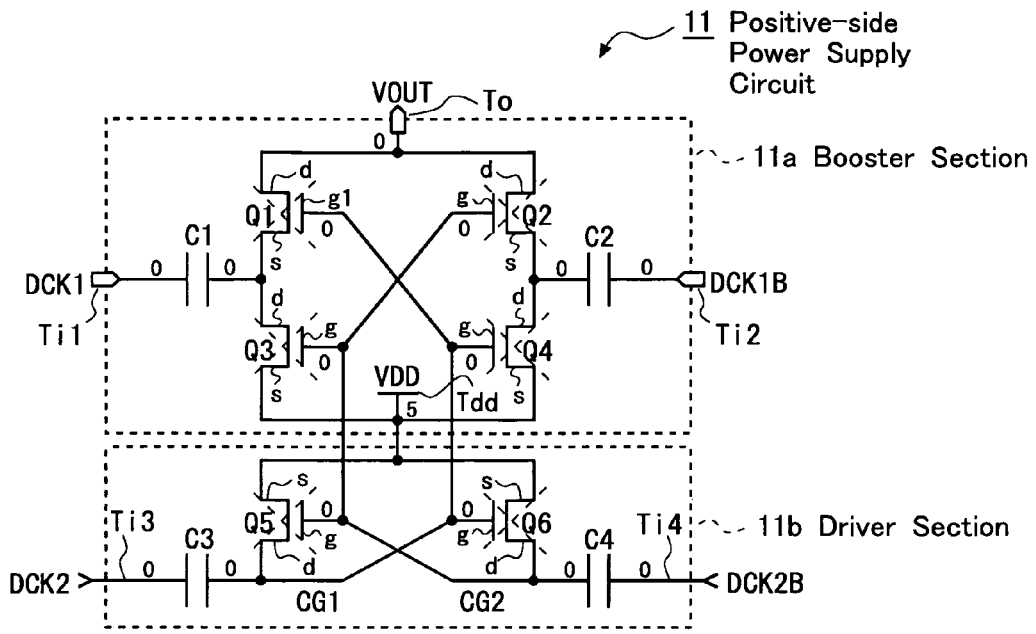
FIG. 5 shows a first operation state of the positive-side power supply circuit in the embodiment.

FIG. 5 shows a state of operation (hereinafter called "the first operation state") right after power application is made to the positive-side power supply circuit 11 which was in the above-described initial state. Note, however, that the external circuit for generating the first and the second clock signals DCK1, DCK1B is not in operation, and therefore the followings are true:

DCK1=DCK1B=0, DCK2=DCK2B=0.

In this first operation state, all of the N-ch transistors Q1 through Q6 have a gate terminal voltage of 0[V]. Since all the other nodes than those corresponding to these gate terminals have a voltage of 0[V] or 5[V], all of the N-ch transistors Q1 through Q6 remain in OFF state.

Figure 6:
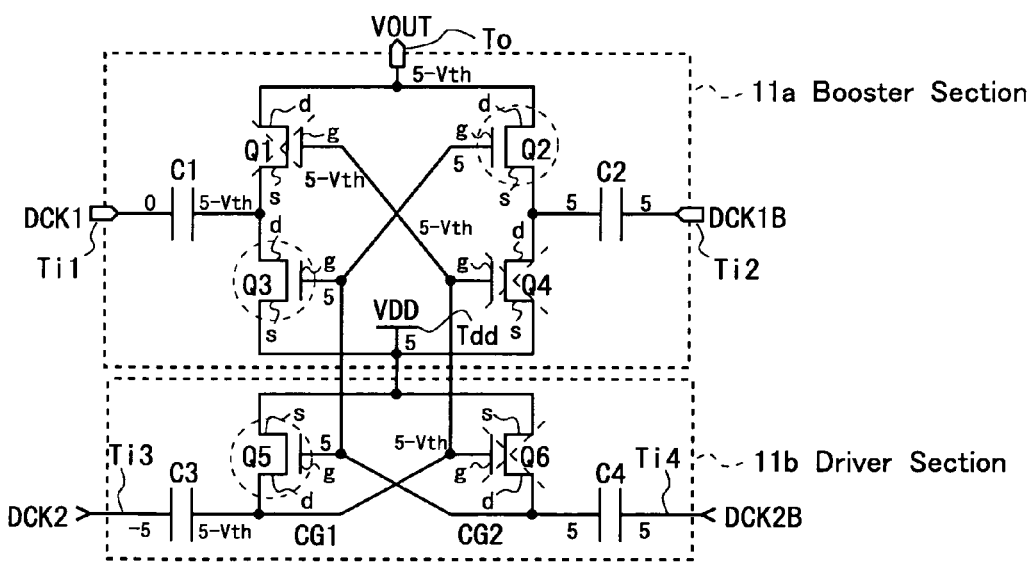
FIG. 6 shows a second operation state of the positive-side power supply circuit in the embodiment.

FIG. 6 shows a state of operation (hereinafter called "the second operation state") of the positive-side power supply circuit 11 right after the external circuit for generating the first and the second clock signals DCK1, DCK1B has started its operation (right after a clock operation has started). Therefore, VDD=5, VSS=0. Assume, however, that the first and the second clock signals DCK1, DCK1B are in the state of Time Period A shown in FIG. 2. This is the time when, as will be described later, the third and the fourth clock signals DCK2, DCK2B shown in FIG. 2 are supplied from the negative-side power supply circuit 12 to the third and the fourth input terminals Ti3, Ti4 respectively. In Time Period A which is right after the clock operation has started, the following conditions exist as shown in FIG. 2:

DCK1=0, DCK1B=5, DCK2=−5, DCK2B=5.

The voltage DCK2B=5 is given, via the capacitors C4, to gate terminals (g) of the transistors Q2, Q3, Q5, and the drain terminal (d) of the transistor Q6. This turns ON the transistors Q2, Q3, Q5, but in these transistors Q2, Q3, Q5, the drain terminals (d) have a lower voltage than 5[V], i.e. a voltage which is lower than the voltage of their source terminals (s) by their threshold voltage Vth. In other words, a voltage drop by threshold value takes place in the N-ch transistors Q2, Q3, Q5.

Meanwhile, at a time point which is right after the change from the first operation state to the second operation state, the third input terminal Ti3 is supplied with a voltage of DCK2=−5, and therefore, there is a voltage fall at the drain terminal (d) of transistor Q5; however, there is also a supply of an electrical charge from the power supply terminal Tdd to the capacitors C3 via the active transistor Q5, and this increases the voltage at the drain terminal (d) of the transistor Q5. But, due to the voltage drop by threshold value as mentioned above, the drain terminal (d) of the transistor Q5 consequently has a voltage of 5-Vth[V]. Likewise, the drain terminals (d) of the transistors Q2 and Q3 have a voltage of 5-Vth[V]. As the drain terminal (d) of the transistor Q5 attains the voltage of 5-Vth[V], the transistors Q1, Q4, Q6 have their gate terminals supplied with a voltage of 5-Vth[V]. On the other hand, the source terminals (s) and the drain terminals (d) of these transistors Q1, Q4, Q6 have a voltage of 5-Vth[V] or 5[V] as shown in FIG. 6 due to the fact that the transistors Q2, Q3, Q5 are in ON state. Therefore, the N-ch transistors Q1, Q4, Q6 stay in OFF state.

Figure 7:
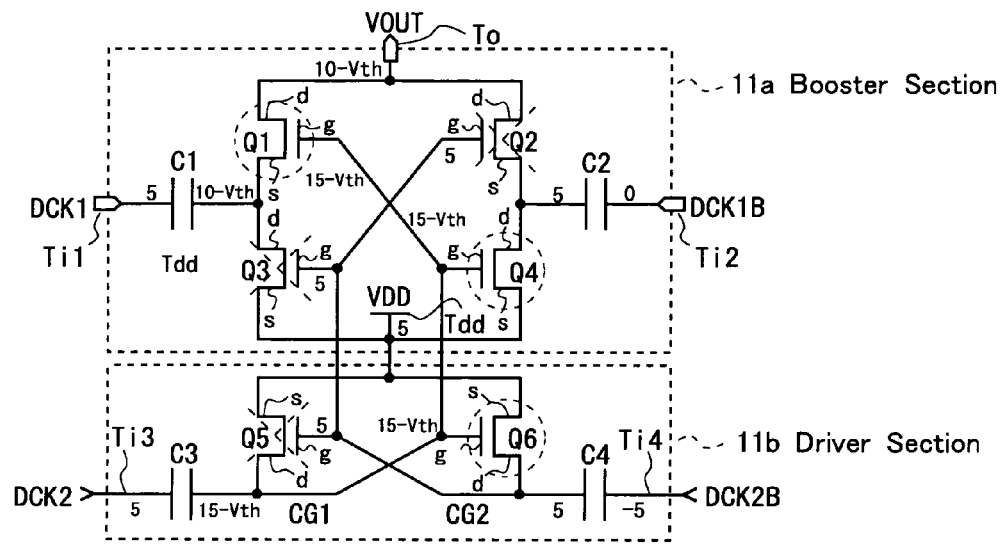
FIG. 7 shows a third operation state of the positive-side power supply circuit in the embodiment.

FIG. 7 shows a state of operation (hereinafter called "the third operation state") of the positive-side power supply circuit 11 in Time Period B which follows Time Period A in the above-described second operation state. In this Time Period B, the following conditions exist as shown in FIG. 2:

DCK1=5, DCK1B=0, DCK2=5, DCK2B=−5.

Therefore, with the shift from Time Period A to Time Period B and as the third operation state takes place, the third clock signal DCK2 rises from −5[V] to 5[V], which causes a voltage rise at the drain terminal (d) of the transistor Q5 and at the gate terminal (g) of the transistor Q6, from 5-Vth[V] to 15-Vth[V]. Also, with the shift from Time Period A to Time Period B, the fourth clock signal DCK2B falls from 5[V] to which causes a temporary voltage fall at the drain terminal (d) of the transistor Q6 and at the gate terminal (g) of the transistor Q5, from 5[V] to −5[V]. This brings the transistor Q5 into OFF state, and the transistor Q6 into ON state. As the transistor Q6 is turned ON, an electrical charge is supplied from the power supply terminal Tdd to the capacitor C4 via the transistor Q6, and this causes the drain terminal (d) of the transistor Q6 to attain the same voltage as the supply voltage VDD, i.e. 5[V]. Therefore, the gate terminals (g) of the transistors Q2, Q3, Q5 also attain 5[V]. Since the transistor Q5 is in OFF state at this point, its drain terminal (d) keeps the voltage of 15-Vth[V], and this 15-Vth[V] is also supplied to the gate terminals (g) of the transistors Q1, Q4.

On the other hand, the shift from Time Period A to Time Period B causes the first clock signal DCK1 to rise from 0[V] to 5[V], which causes a voltage rise at the source terminal (s) of the transistor Q1 and the drain terminal (d) of the transistor Q3, from 5-Vth[V] to 10-Vth[V]. Since the transistor Q1 has its gate terminal (g) supplied with 15-Vth[V], and the transistor Q3 has its gate terminal (g) supplied with 5[V] as described above, the transistor Q1 as the output-side switching element assumes ON state whereas the transistor Q3 as the input-side switching element assumes OFF state. Although the transistors Q1, Q2 and so on are provided by thin film transistors made of polycrystal silicon, their threshold voltage Vth is 2 through 3[V] at the highest. On the other hand, the transistor Q1 has a gate-source voltage of:

(15-Vth)−(10-Vth)=5[V]

This value is sufficiently higher than the threshold voltage Vth. For this reason, the transistor Q1 as the output-side switching element does not have a voltage drop by threshold value, and the output terminal To has a voltage of 10-Vth.

Also, with the shift from Time Period A to Time Period B, the second clock signal DCK1B falls from 5[V] to 0[V], which causes a temporary voltage fall at the source terminal (s) of the transistor Q2 and the drain terminal (d) of the transistor Q4, from 5[V] to 0[V]. However, the transistor Q4 which serves as the input-side switching element has its gate terminal (g) supplied with 15-Vth[V] as described above, and therefore assumes ON state. Thus, an electrical charge is supplied from the power supply terminal Tdd to the capacitor C2 via the transistor Q4, and this causes the drain terminal (d) of the transistor Q4 and the source terminal (s) of the transistor Q2 to attain the same voltage as the supply voltage VDD, i.e. 5[V]. Upon this point, in the transistor Q2, the gate terminal (g), the source terminal (s) and the drain terminal (d) attain 5[V], 5[V] and 10-Vth[V] respectively, bringing the transistor Q2 as the output-side switching element into OFF state.

Figure 8:
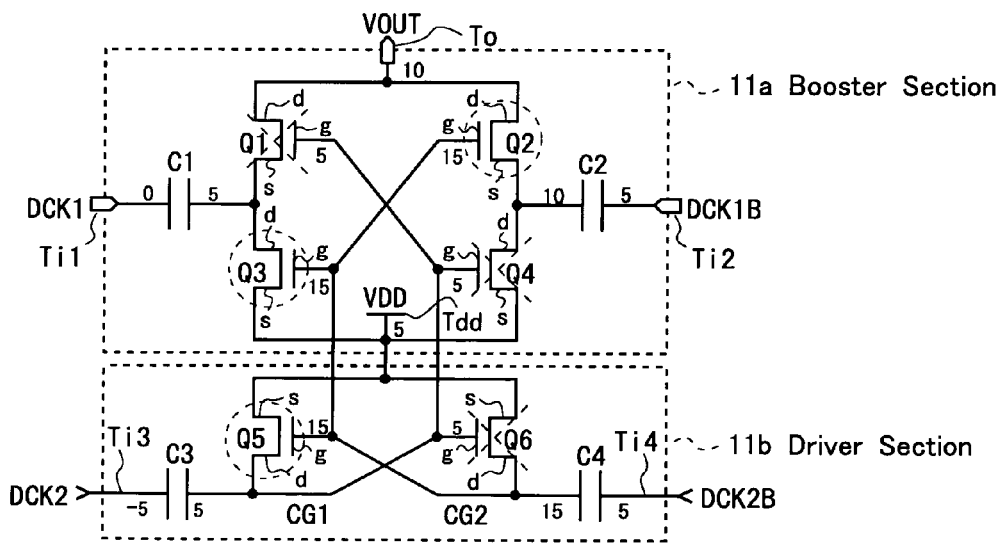
FIG. 8 shows a fourth operation state of the positive-side power supply circuit in the embodiment.

FIG. 8 shows a state of operation (hereinafter called "the fourth operation state") of the positive-side power supply circuit 11 in Time Period A which follows Time Period B in the above-described third operation state. With the shift from Time Period B to Time Period A and as the fourth operation state takes place, the third clock signal DCK2 falls from 5[V] to −5[V], which causes a temporary voltage fall at the drain terminal (d) of the transistor Q5 and at the gate terminals (g) of the transistor Q6, from 15-Vth[V] to 5-Vth[V]. Also, with the shift from Time Period B to Time Period A, the fourth clock signal DCK2B rises from −5[V] to 5[V], which causes a voltage rise at the drain terminal (d) of the transistor Q6 and the gate terminal (g) of the transistor Q5, from 5[V] to 15[V]. This brings the transistor Q5 into ON state and the transistor Q6 into OFF state. As the transistor Q5 is turned ON, an electrical charge is supplied from the power supply terminal Tdd to the capacitor C3 via the transistor Q5, and this causes the drain terminal (d) of the transistor Q5 to attain the same voltage as the source voltage VDD, i.e. 5[V]. Therefore, the gate terminals (g) of the transistors Q1, Q4, Q6 also attain 5[V]. Since the transistor Q6 is in OFF state at this point, its drain terminal (d) keeps the voltage of 15[V], and this 15[V] is also supplied to the gate terminals (g) of the transistors Q2, Q3.

On the other hand, with the shift from Time Period B to Time Period A, the second clock signal DCK1B rises from 0[V] to 5[V], which causes a voltage rise at the source terminal (s) of the transistor Q2 and the drain terminal (d) of the transistor Q4, from 5[V] to 10[V]. Since the transistor Q2 has its gate terminal (g) supplied with 15[V], and the transistor Q4 has its gate terminal (g) supplied with 5[V] as has been described, the transistor Q2 as the output-side switching element assumes ON state whereas the transistor Q4 as the input-side switching element assumes OFF state. Upon this point, the N-ch transistor Q2 has a gate-source voltage of 15−10=5[V], which is sufficiently higher than the threshold voltage Vth. Hence, the transistor Q2 as the output-side switching element does not have a voltage drop by threshold value, and the output terminal To has a voltage of 10[V].

Also, with the shift from Time Period B to Time Period A, the first clock signal DCK1 falls from 5[V] to 0[V], which causes a temporary voltage fall at the source terminal (s) of the transistor Q1 and the drain terminal (d) of the transistor Q3, from 10-Vth[V] to 5-Vth[V]. However, the transistor Q3 which serves as the input-side switching element has its gate terminal (g) supplied with 15[V] as described above, and therefore assumes ON state. Thus, an electrical charge is supplied from the power supply terminal Tdd to the capacitor C1 via the transistor Q3, and this causes the drain terminal (d) of the transistor Q3 and the source terminal (s) of the transistor Q1 to attain the same voltage as the supply voltage VDD, i.e. 5[V]. Upon this point, in the transistor Q1, the gate terminal (g), the source terminal (s) and the drain terminal (d) attain 5[V], 5[V] and 10[V] respectively, bringing the transistor Q2 as the output-side switching element into OFF state.

Figure 9:
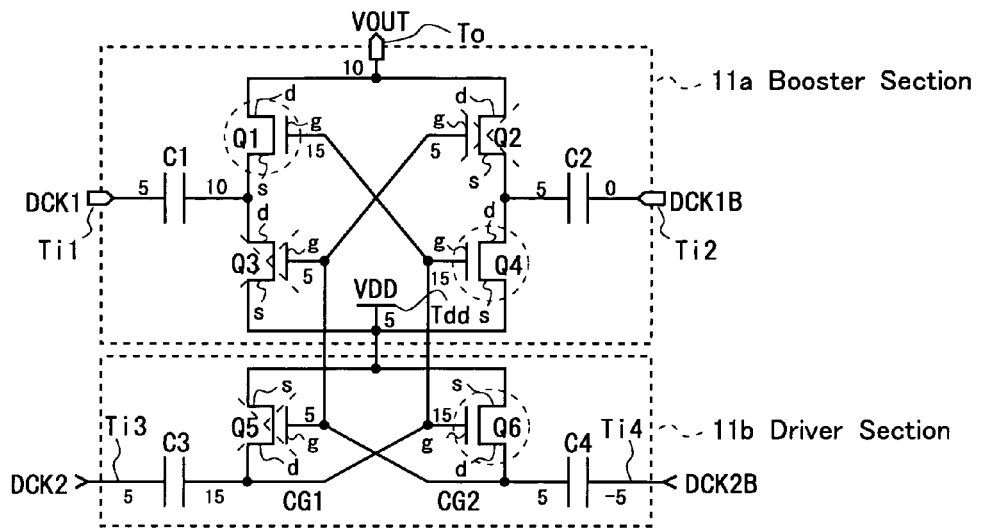
FIG. 9 shows a fifth operation state of the positive-side power supply circuit in the embodiment.

FIG. 9 shows a state of operation (hereinafter called "the fifth operation state") of the positive-side power supply circuit 11 in Time Period B which follows Time Period A in the above-described fourth operation state. With the shift from Time Period A to Time Period B and as the fifth operation state takes place, the third clock signal DCK2 rises from −5[V] to 5[V], which causes a voltage rise at the drain terminal (d) of the transistor Q5 and the gate terminal (g) of the transistor Q6, from 5[V] to 15[V]. Also, with the shift from Time Period A to Time Period B, the fourth clock signal DCK2B falls from 5[V] to −5[V], which causes a voltage fall at the drain terminal (d) of the transistor Q6 and the gate terminal (g) of the transistor Q5, from 15[V] to 5[V]. This brings the transistor Q5 into OFF state and the transistor Q6 into ON state. The drain terminal (d) of the transistor Q5 and the gate terminal (g) of the transistor Q6 retain their 15[V], and the drain terminal (d) of the transistor Q6 and the gate terminal (g) of the transistor Q5 retain their 5[V]. Therefore, in the booster section 11a, the transistors Q1, Q4 have their gate terminals (g) supplied with 15[V], and the transistors Q2, Q3 have their gate terminals (g) supplied with 5[V].

On the other hand, with the shift from Time Period A to Time Period B, the first clock signal DCK1 rises from 0[V] to 5[V], which causes a voltage rise at the source terminal (s) of the transistor Q1 and the drain terminal (d) of the transistor Q3, from 5[V] to 10[V]. Since the transistor Q1 has its gate terminal (g) supplied with 15[V] and the transistor Q3 has its gate terminal (g) supplied with 5[V] as has been described, the transistor Q1 as the output-side switching element assumes ON state whereas the transistor Q3 as the input-side switching element assumes OFF state. Upon this point, the N-ch transistor Q1 has a gate-source voltage of 15−10=5[V], which is sufficiently higher than the threshold voltage Vth. Hence, the transistor Q1 as the output-side switching element does not have a voltage drop by threshold value, and the output terminal To has a voltage of 10[V].

Also, with the shift from Time Period A to Time Period B, the second clock signal DCK1B falls from 5[V] to 0[V], which causes a voltage fall at the source terminal (s) of the transistor Q2 and the drain terminal (d) of the transistor Q4, from 10[V] to 5[V]. On the other hand, the transistor Q4 which serves as the input-side switching element has its gate terminal (g) supplied with 15[V] as described above, and therefore assumes ON state. Thus, the supply voltage VDD (=5[V]) is supplied to the capacitor C2 via the transistor Q4, and the capacitor C2 retains the charge at 5[V]. Upon this point, in the transistor Q2, the gate terminal (g), the source terminal (s) and the drain terminal (d) have 5[V], 5[V] and 10[V] respectively, bringing the transistor Q2 as the output-side switching element into OFF state.

Figure 10:
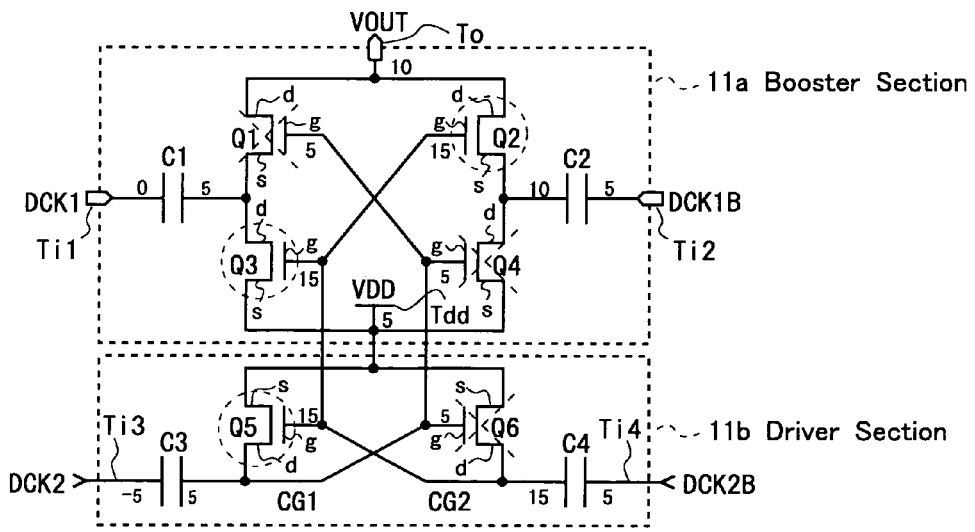
FIG. 10 shows a sixth operation state of the positive-side power supply circuit in the embodiment.

FIG. 10 shows a state of operation (hereinafter called "the sixth operation state") of the positive-side power supply circuit 11 in Time Period A which follows Time Period B in the above-described fifth operation state. With the shift from Time Period B to Time Period A and as the sixth operation state takes place, the third clock signal DCK2 falls from 5[V] to −5[V], which causes a voltage fall at the drain terminal (d) of the transistor Q5 and the gate terminal (g) of the transistor Q6, from 15[V] to 5[V]. Also, with the shift from Time Period B to Time Period A, the fourth clock signal DCK2B rises from −5[V] 5[V], which causes a voltage rise at the drain terminal (d) of the transistor Q6 and the gate terminal (g) of the transistor Q5, from 5[V] to 15[V]. This brings the transistor Q5 into ON state, and the transistor Q6 into OFF state. The drain terminal (d) of the transistor Q5 and the gate terminal (g) of the transistor Q6 retain their 5[V], and the drain terminal (d) of the transistor Q6 and the gate terminal (g) of the transistor Q5 retains their 15[V]. Therefore, in the booster section 11a, the transistors Q1, Q4 have their gate terminals (g) supplied with 5[V], and the transistors Q2, Q3 have their gate terminals (g) supplied with 15[V].

On the other hand, with the shift from Time Period B to Time Period A, the second clock signal DCK1B rises from 0[V] to 5[V], which causes a voltage rise at the source terminal (s) of the transistor Q2 and the drain terminal (d) of the transistor Q4, from 5[V] to 10[V]. Since the transistor Q2 has its gate terminal (g) supplied with 15[V] and the transistor Q4 has its gate terminal (g) supplied with 5[V] as has been described, the transistor Q2 as the output-side switching element assumes ON state whereas the transistor Q4 as the input-side switching element assumes OFF state. Upon this point, the N-ch transistor Q2 has a gate-source voltage of 15−10=5[V], which is sufficiently higher than the threshold voltage Vth. Hence, the transistor Q2 as the output-side switching element does not have a voltage drop by threshold value, and the output terminal To has a voltage of 10[V].

Also, with the shift from Time Period B to Time Period A, the first clock signal DCK1 falls from 5[V] to 0[V], which causes a voltage fall at the source terminal (s) of the transistor Q1 and the drain terminal (d) of the transistor Q3, from 10[V] to 5[V]. Since the transistor Q3 has its gate terminal (g) supplied with 15[V] as has been described, the transistor Q3 as the input-side switching element assumes ON state. Thus, the supply voltage VDD (=5[V]) is supplied to the capacitor C1 via the transistor Q3, and the capacitor C1 retains the charge at 5[V]. Upon this point, in the transistor Q1, the gate terminal (g), the source terminal (s) and the drain terminal (d) have 5[V], 5[V] and 10[V] respectively, bringing the transistor Q1 as the output-side switching element into OFF state.

Thereafter, the positive-side power supply circuit 11 enters its steady operation in which the sixth operation state shown in FIG. 10 and the fifth operation state shown in FIG. 9 take place alternately to each other. In Time Period A of the sixth operation state, the first capacitor C1 is charged with a supply of the supply voltage VDD (=5[V]) via the transistor Q3 whereas a boosted voltage (=10[V]) resulting at a terminal of the second capacitor C2 is outputted from the output terminal To via the transistor Q2. In Time Period B of the fifth operation state, the second capacitor C2 is charged with a supply of the supply voltage VDD (=5[V]) via the transistor Q4 whereas a boosted voltage (=10[V]) resulting at a terminal of the first capacitor C1 is outputted from the output terminal To via the transistor Q1. In the steady operation, the alternately repeating cycle of the fifth operation state and the sixth operation state as described above provides complementary voltage boosting, to yield a voltage of 2VDD(=10[V]), which is outputted as a boosted supply voltage VOUT from the output terminal To, without a voltage drop by threshold value.

<3. Operation of the Negative-Side Power Supply Circuit>

Next, reference will be made to FIG. 11 through FIG. 15 to describe an operation of the negative-side power supply circuit 12 according to the present embodiment. As has been described already, the operation of the negative-side power supply circuit 12 will be described using the same legends (such as circles and crosses drawn in broken lines to indicate ON state and OFF state of the transistors) and assumptions (such as the value of the supply voltage VDD) as used in describing the operation of the positive-side power supply circuit 11.

First, consideration will be made for a state of the negative-side power supply circuit 12 before there is a supply of power. Under this state, VDD=VSS=0. The external circuits for generating the first and the second clock signals DCK1, DCK1B are not in operation, and all the nodes have a potential of 0[V]. (Assume also that none of the capacitors C5 and C6 have a charge.) Now, the present state can be expressed as follows by using the signal symbols such as "DCK1" as also indicating their potentials (or voltages based on the grounding point as a baseline) at the nodes where these signals are given:

DCK1=DCK1B=0, DCK2=DCK2B=0, VoN=0, where DCK2=DCK2B=0 indicates that the first and the second clock output terminals Tco1, Tco2 have a voltage of 0[V]. Upon this point, therefore, the positive-side power supply circuit 11 also has a voltage of 0[V] at its third and fourth input terminals Ti3, Ti4. In the initial state, all the transistors Q7 through Q12 are in OFF state.

Figure 11:
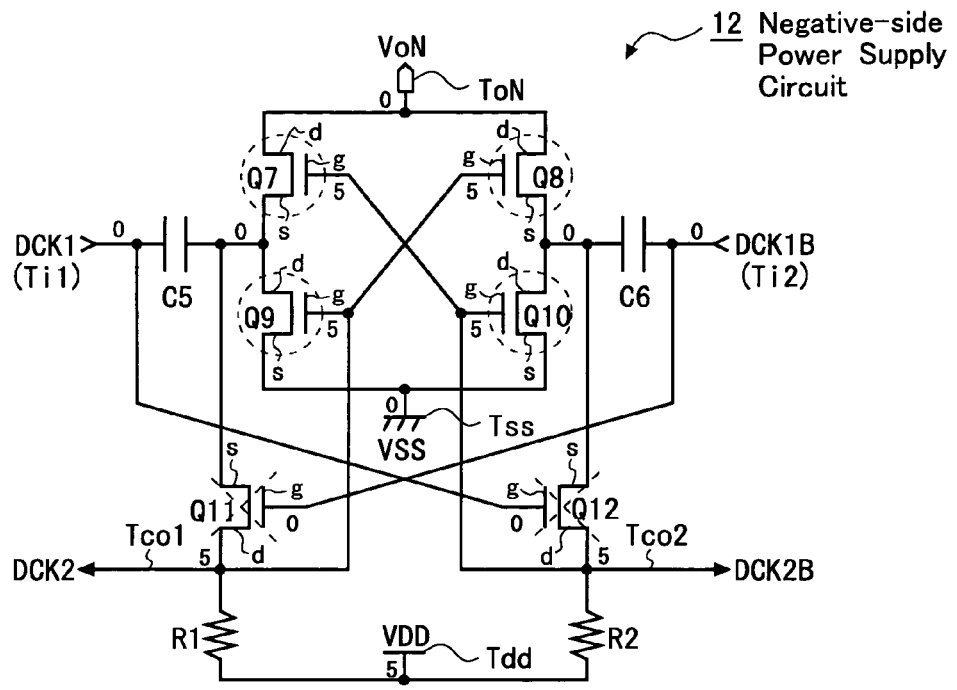
FIG. 11 shows a first operation state of the negative-side power supply circuit in the embodiment.

FIG. 11 shows a state of operation (hereinafter called "the first operation state") right after a power application is made to the negative-side power supply circuit 12 which was in the above-described initial state. Therefore, VDD=5, VSS=0, but note, however, that the external circuit for generating the first and the second clock signals DCK1, DCK1B is not in operation, and therefore, DCK1=DCK1B=0. In this first operation state, both of the N-ch transistors Q11, Q12 have a gate terminal voltage of 0[V], and therefore are in OFF state. The transistors Q11, Q12 have their drain terminals (d) connected with the power supply terminal Tdd via the first and the second resistive elements R1, R2 respectively. Now, the first and the second resistive elements R1, R2 have resistance values which are sufficiently greater than an ON resistance value of the transistors Q11, Q12, and these resistive elements function as pull-up resistors. Hence, both of the transistors Q11, Q12 have their drain terminals (d) attain a voltage of 5[V], i.e. DCK2=DCK2B=5. This 5[V] is supplied to gate terminals (g) of the transistors Q7 through Q10. On the other hand, the source terminals (s) and drain terminals (d) of the transistors Q7 through Q10 have a voltage of 0[V] Therefore, all of the transistors Q7 through Q10 assume ON state.

Figure 12:
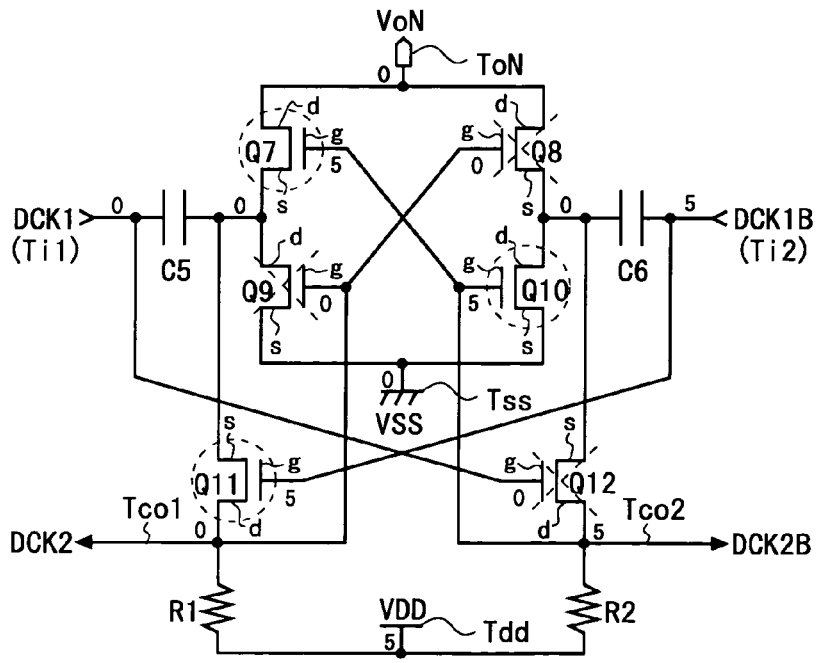
FIG. 12 shows a second operation state of the negative-side power supply circuit in the embodiment.

FIG. 12 shows a state of operation (hereinafter called "the second operation state") of the negative-side power supply circuit 12 right after the external circuit which generates the first and the second clock signals DCK1, DCK1B have started their operation. Assume, however, that the first and the second clock signals DCK1, DCK1B are in the state of Time Period A shown in FIG. 2. Upon this point, DCK1=0, DCK1B=5, and these voltages of the first and the second clock signals DCK1, DCK1B are supplied to respective gate terminals (g) of the transistors Q12, Q11. Therefore, the transistor Q12 stays in OFF state whereas the transistor Q11 assumes ON state. Thus, in the transistor Q11, the drain terminal (d) attains a voltage of 0[V], i.e. DCK2=0. It should be noted here that as the transistor Q11 assumes ON state, an electrical charge is supplied from the power supply terminal Tdd to the capacitor C5 via the first resistive element R1 and the transistor Q11; however, it is regarded that the state of DCK2=0 is maintained during Time Period A (during a half of the repetition period of the first and the second clock signals DCK1, DCK1B) shown in FIG. 2, since a sufficiently large value is assured by a multiplication (or a time constant based on the product of the multiplication) of the resistance value of the resistive element R1 by the capacitance value of the capacitor C5.

Meanwhile, with the shift from the first operation state to the second operation state, the second clock signal DCK1B rises from 0[V] to 5[V], which causes a temporary voltage rise at the drain terminal (d) of the transistor Q10, from 0[V] to 5[V]. However, since the transistor Q10 stays in ON state, the voltage at the drain terminal (d) of the transistor Q10 returns to 0[V]. On the other hand, in the transistor Q11, the voltage at the drain terminal (d), i.e. the voltage of the third clock signal DCK2 becomes 0[V] as described above, and therefore, the transistors Q8, Q9 have their gate terminals (g) supplied with 0[V], to assume OFF state. The transistor Q7 stays in ON state.

Figure 13:
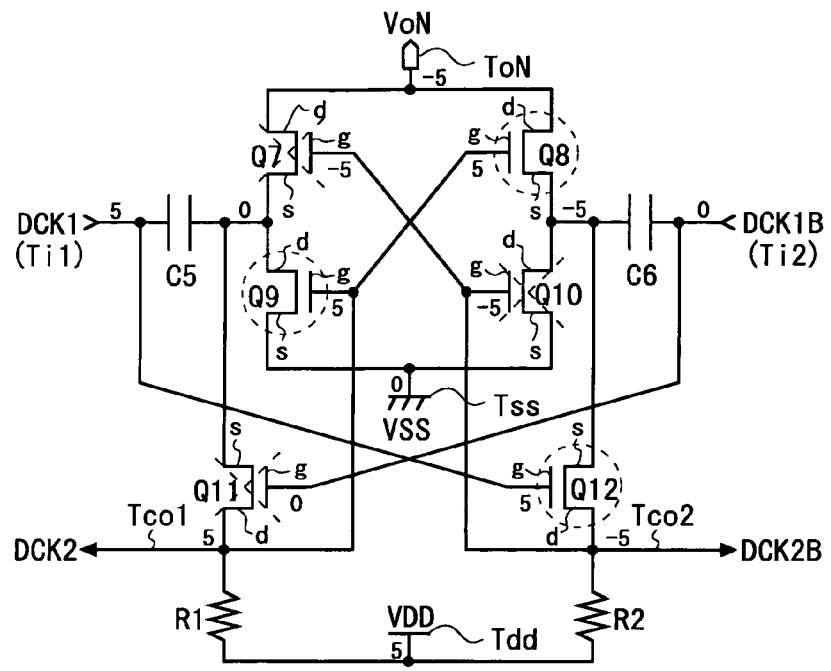
FIG. 13 shows a third operation state of the negative-side power supply circuit in the embodiment.

FIG. 13 shows a state of operation (hereinafter called "the third operation state") of the negative-side power supply circuit 12 in Time Period B which follows Time Period A in the above-described second operation state. In Time Period B, DCK1=5, and DCK1B=0 as shown in FIG. 2. Since these voltages of the first and the second clock signals DCK1, DCK1B are supplied to respective gate terminals (g) of the transistors Q12, Q11, the transistor Q12 assumes ON state whereas the transistor Q11 assumes OFF state. As the transistor Q11 is turned OFF, the first resistive element R1 functions as a pull-up resistor, to raise the voltage at the drain terminal (d) of the transistor Q11, i.e. to raise the voltage of the third clock signal DCK2 to 5[V]. This 5[V] voltage is supplied to gate terminals (g) of the transistors Q8, Q9.

On the other hand, the shift from the Time Period A to Time Period B causes the second clock signal DCK1B to fall from 5[V] to 0[V], which causes a voltage fall at the source terminal (s) of the transistor Q12, i.e. the voltage at the first terminal of the capacitor C6, from 0[V] to −5[V]. Since the transistor Q12 is in ON state, the voltage at the drain terminal (d) in the transistor Q12, i.e. the fourth clock signal DCK2B also attains −5[V]. This −5[V] is also supplied to gate terminals (g) of the transistors Q7, Q10, bringing these transistors Q7, Q10 into OFF state. It should be noted that as the transistor Q12 assumes ON state, an electrical charge is supplied from the power supply terminal Tdd, to the capacitor C6 via the second resistive element R2 and the transistor Q12; however, a sufficiently large value is assured by a multiplication (or a time constant based on the product of the multiplication) of the resistance value of the resistive element R2 and the capacitance value of the capacitor C6, and further, the transistor Q10 has its gate terminal (g) supplied with a −5[V] voltage, to assume OFF state. Therefore, it is regarded that the state of DCK2B=−5 is maintained during Time Period B shown in FIG. 2 (during a half of the repetition period of the first and the second clock signals DCK1, DCK1B).

On the other hand, the shift from Time Period A to Time Period B causes the first clock signal DCK1 to rise from 0[V] to 5[V], which causes a temporary voltage rise at the drain terminal (d) of the transistor Q9, i.e. the voltage at the first terminal of the capacitor C5, from 0[V] to 5[V]. However, since the transistor Q9 has its gate terminal (g) supplied with 5[V], and assumes ON state, the voltage at this first terminal of the capacitor C5 returns to 0[V].

The transistor Q8 has its gate terminal (g) and source terminal (s) supplied with 5[V] and −5[V] respectively, and assumes ON state. As a result, the first terminal of the capacitor C6 becomes electrically continuous to the negative output terminal ToN via the transistor Q8, causing the negative output terminal ToN to have a voltage of −5[V].

Figure 14:
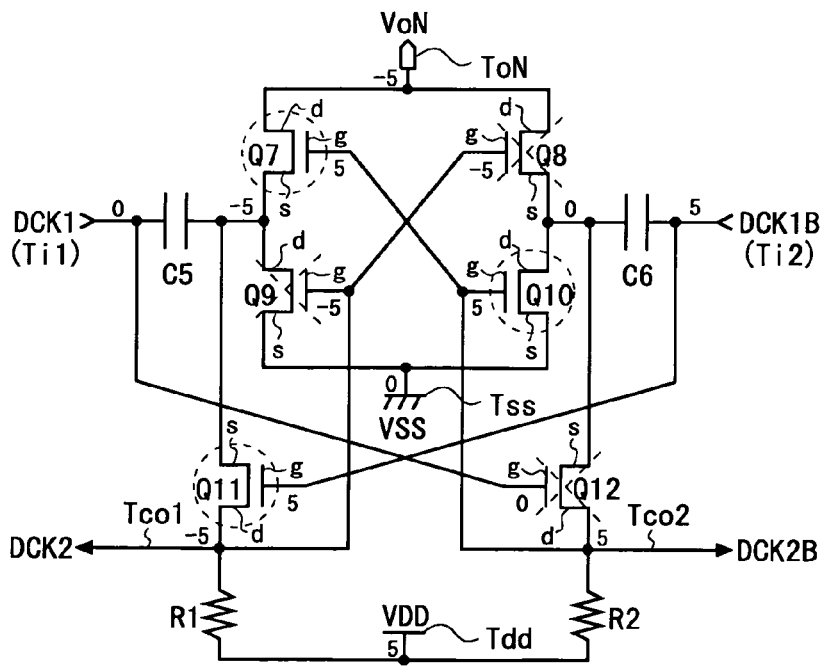
FIG. 14 shows a fourth operation state of the negative-side power supply circuit in the embodiment.

FIG. 14 shows a state of operation (hereinafter called "the fourth operation state") of the negative-side power supply circuit 12 in Time Period A which follows Time Period B in the above-described third operation state. With the shift from Time Period B to Time Period A and as the fourth operation state takes place, the first clock signal DCK1 falls from 5[V] to 0[V], which causes a voltage fall at the gate terminal (g) of the transistor Q12, from 5[V] to 0[V], and a voltage fall at the source terminals (s) of the transistors Q7, Q11, from 0[V] to −5[V]. The shift from Time Period B to Time Period A also causes the second clock signal DCK1B to rise from 0[V] to 5[V], which causes a voltage rise at the gate terminal (g) of the transistor Q11, from 0[V] to 5[V], and a voltage rise at the source terminals (s) of the transistors Q8, Q12, from −5[V] to 0[V]. As described, the transistor Q11 has its gate terminal (g) and source terminal (s) supplied with 5[V] and −5[V] respectively, and therefore assumes ON state whereas the transistor Q12 has both of its gate terminal (g) and source terminal (s) supplied with 0[V], and therefore assumes OFF state.

As the transistor Q12 is turned OFF, the second resistive element R2 functions as a pull-up resistor and the voltage at the drain terminal (d) of the transistor Q12, i.e. the voltage of the fourth clock signal DCK2B becomes 5[V]. This 5[V] is supplied to the gate terminals (g) of the transistors Q7, Q10.

On the other hand, as the transistor Q11 assumes ON state, the voltage at the drain terminal (d) of the transistor Q11, i.e. the voltage of the third clock signal DCK2, becomes equal to the voltage of the source terminal (s) in the transistor Q11, i.e. −5[V]. This −5[V] is also supplied to the gate terminals (g) of the transistors Q8, Q9, bringing the transistors Q8, Q9 into OFF state. It should be noted that a sufficiently large value is assured by a multiplication (or a time constant based on the product of the multiplication) of the resistor value of the resistive element R1 and the capacitance value of the capacitor C5; therefore, the state of DCK2=−5 is maintained during Time Period A shown in FIG. 2 even if the transistor Q11 is turned ON.

The transistor Q7 has its gate terminal (g) and source terminal (s) supplied with 5[V] and −5[V] respectively as described above, and therefore assumes ON state. As a result, the first terminal of the capacitor C5 becomes electrically continuous to the negative output terminal ToN via the transistor Q7, causing the negative output terminal ToN to have a voltage of −5[V].

The transistor Q10 has its gate terminal (g) and source terminal (s) supplied with 5[V] and 0[V] respectively as described above, and therefore assumes ON state. As a result, the first terminal of the capacitor C6 becomes electrically continuous to the grounding terminal Tss via the transistor Q10, and attains a voltage of 0[V].

Figure 15:
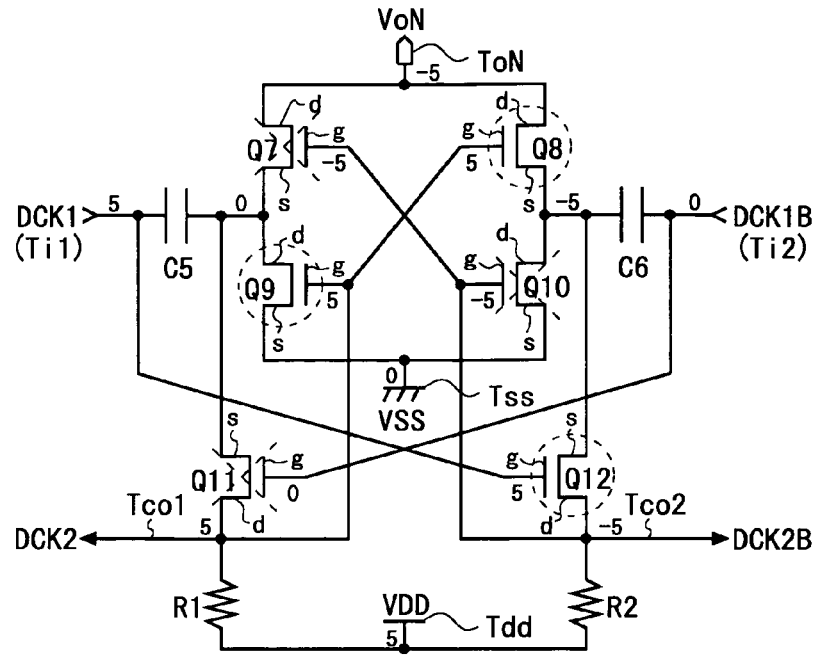
FIG. 15 shows a fifth operation state of the negative-side power supply circuit in the embodiment.

FIG. 15 shows a state of operation (hereinafter called "the fifth operation state") of the negative-side power supply circuit 12 in Time Period B which follows Time Period A in the above-described fourth operation state. With the shift from Time Period A to Time Period B and as the fifth operation state takes place, the first clock signal DCK1 rises from 0[V] to 5[V], which causes a voltage rise at the gate terminal (g) of the transistor Q12 from 0[V] to 5[V], and a voltage rise at the source terminals (s) in the transistors Q7, Q11, from −5[V] to 0[V]. The shift from Time Period A to Time Period B also causes a voltage fall at the second clock signal DCK1B, from 5[V] to 0[V], which causes a voltage fall at the gate terminal (g) of the transistor Q11, from 5[V] to 0[V], and a voltage fall at source terminals (s) in the transistors Q8, Q12, from 0[V] to −5[V]. As described, the transistor Q11 has both of its gate terminal (g) and source terminal (s) supplied with 0[V], and therefore assumes OFF state whereas the transistor Q12 has its gate terminal (g) and source terminal (s) supplied with 5[V] and −5[V], and therefore assumes ON state.

As the transistor Q11 assumes OFF state, the first resistive element R1 functions as a pull-up resistor, to raise the voltage at the drain terminal (d) of the transistor Q11, i.e. to raise the voltage of the third clock signal DCK2, to 5[V]. This 5[V] is supplied to the gate terminals (g) of the transistors Q8, Q9.

On the other hand, as the transistor Q12 assumes ON state, the voltage at the drain terminal (d) of the transistor Q12, i.e. the voltage of the fourth clock signal DCK2B becomes equal to the voltage of the source terminal (s) of the transistor Q12, i.e. −5[V]. This −5[V] is also supplied to the gate terminals (g) of the transistors Q7, Q10, bringing the transistors Q7, Q10 into OFF state. It should be noted that a sufficiently large value is assured by a multiplication (or a time constant based on the product of the multiplication) of the resistor value of the resistive element R2 and the capacitance value of the capacitor C6, and therefore the state of DCK2B=−5 is maintained during Time Period B shown in FIG. 2 even if the transistor Q12 is turned ON.

The transistor Q8, which has its gate terminal (g) and source terminal (s) supplied with 5[V] and −5[V] respectively as described above, assumes ON state. As a result, the first terminal of the capacitor C6 becomes electrically continuous to the negative output terminal ToN via the transistor Q8, and the negative output terminal ToN attains a voltage of −5[V].

The transistor Q9, which has its gate terminal (g) and source terminal (s) supplied with 5[V] and 0[V] respectively as described above, assumes ON state. As a result, the first terminal of the capacitors C5 becomes electrically continuous to the grounding terminal Tss via the transistor Q9, and attains 0[V].

Thereafter, the negative-side power supply circuit 12 enters its steady operation in which the fourth operation state shown in FIG. 14 and the fifth operation state shown in FIG. 15 take place alternately to each other. In Time Period A of the fourth operation state, the capacitor C6 is charged as its first terminal is supplied with the grounding voltage VSS(=0[V]) via the transistor Q10 and its second terminal is supplied with DCK1B(=5[V]), whereas the negative voltage (=−5[V]) which is obtained at the first terminal of the capacitor C5 is outputted from the negative output terminal ToN via the transistor Q7. In Time Period B of the fifth operation state, the capacitor C5 is charged as its first terminal is supplied with the grounding voltage VSS(=0[V]) via the transistor Q9 and its second terminal is supplied with DCK1(=5[V]), whereas the negative voltage (=−5[V]) obtained at the first terminal of the capacitor C6 is outputted from the negative output terminal ToN via the transistor Q8.

In the steady operation as described above, the negative-side power supply circuit 12 outputs, as shown in FIG. 2, a pulse signal which has a voltage level of −5[V] during Time Period A and a voltage level of 5[V] during Time Period B, as the third clock signal DCK2 from the first clock output terminal Tco1, as well as outputting a pulse signal which has a voltage level of 5[V] during Time Period A and a voltage level of −5[V] during Time Period B, i.e. a pulse signal which has a voltage alternating oppositely to the third clock signal DCK2, as the fourth clock signal DCK2B from the second clock output terminal Tco2. These third and fourth clock signals DCK2, DCK2B are utilized in the positive-side power supply circuit 11 for generating the boosted supply voltage 2VDD as described earlier.

<4. Advantages>

According to the present embodiment as described above, turning ON the N-ch transistors Q1 through Q4 which are provided as switching elements that constitute the booster section 11a of the positive-side power supply circuit gives their gate terminals a three-fold supply of the supply voltage VDD (=5[V]), i.e., a voltage of 3VDD (=15[V]). This ensures the N-ch transistors Q1, Q2 to output a boosted voltage of 2VDD as a boosted supply voltage VOUT from the output terminal To, without a voltage drop by threshold value. In other words, even if the switching elements are provided solely by N-channel transistors as shown in FIG. 3 and FIG. 4, it is possible to boost a supply voltage without causing a voltage drop by threshold value. Therefore, it is now possible to provide a power supply circuit which is capable of outputting a desired boosted supply voltage reliably without being affected by threshold values or variations thereof, at a lower manufacturing cost through a simplified process of manufacture than necessary for CMOS (Complementary Metal Oxide Semiconductor) type products which require both of N-channel transistors and P-channel transistors.

Also, according to the present embodiment, driving of the positive-side power supply circuit 11 requires the third and the fourth clock signals DCK2, DCK2B each having a voltage alternating oppositely to each other between the supply voltage VDD (=5[V]) and a negative voltage −VDD(=−5[V]) which has the same absolute value as the supply voltage VDD. These third and fourth clock signals DCK2, DCK2B are obtained in the negative-side power supply circuit 12 in the process of generating the negative supply voltage (−VDD) from the supply voltage VDD (see FIG. 1, FIG. 14, and FIG. 15). Therefore, the embodiment provides a way to implement a low cost, compact power supply circuit for such an electronic device as a liquid crystal display device which requires both of the boosted supply voltage 2VDD and the negative supply voltage (−VDD).

Further, according to the present embodiment, only one supply voltage VDD is enough as the external supply of supply voltage to meet the generation requirement for the boosted supply voltage (2VDD) and the negative supply voltage (−VDD). Similarly, signals which must be supplied externally are only clock signals DCK1, DCK1B of a corresponding amplitude to that of the supply voltage VDD. This is an advantage which helps simplify a power supply configuration of the electronic devices which employ a power supply circuit according to the present embodiment.

<5. Variations>
<5.1 First Variation>

The above-described embodiment provides both of a boosted supply voltage (2VDD) and a negative supply voltage (−VDD). If there is no need for generating a negative supply voltage, the negative-side power supply circuit 12 may be replaced by a portion 12a of the negative-side power supply circuit 12 that does not include the transistors Q7, Q8 and the negative output terminal ToN. As understood from FIG. 4, the portion 12a can be regarded as a level shifter which converts signals DCK1, DCK1B each having a voltage alternating oppositely to each other between the supply voltage VDD (=5[V]) and the grounding voltage VSS (=0[V]), into the third and the fourth clock signals DCK2, DCK2B each having a voltage alternating oppositely to each other between the negative supply voltage (−VDD(−5[V])) and the supply voltage VDD (=5[V]).

Figure 16:
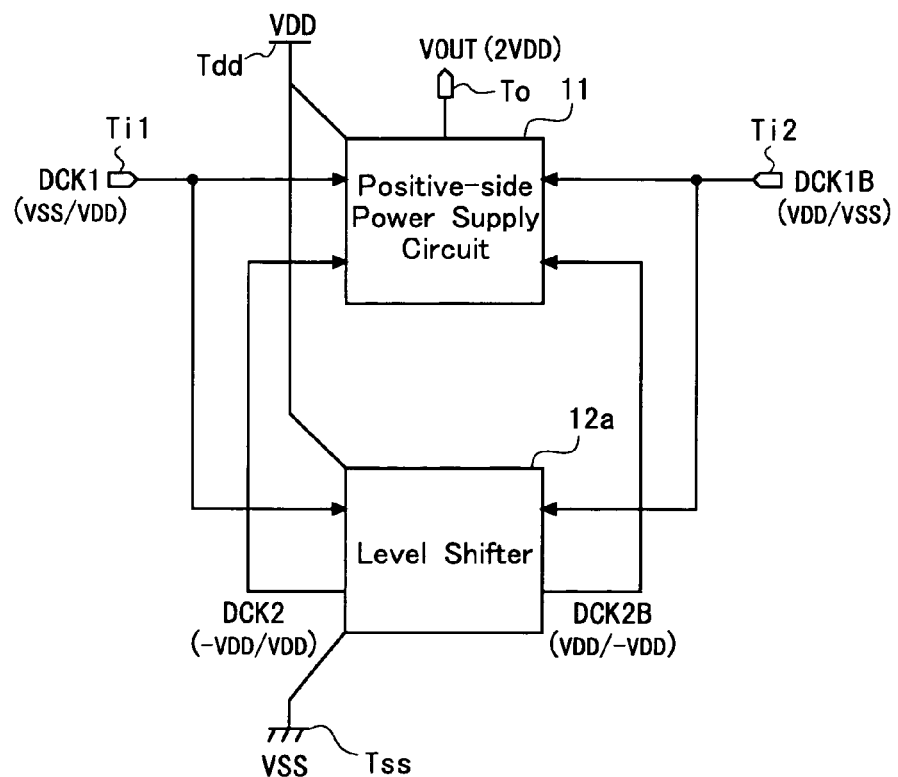
FIG. 16 is a block diagram which shows a configuration of a first variation of the embodiment.

FIG. 16 is a block diagram of a power supply circuit which utilizes the level shifter 12a described above, as a first variation of the foregoing embodiment. In the first variation, the negative-side power supply circuit 12 in FIG. 1 in the foregoing embodiment is replaced with the level shifter 12a (see FIG. 4). The first variation as such provides a power supply circuit which offers the same advantages as the foregoing embodiment, except that there is no supply of a negative supply voltage.

<5.2 Second Variation>

The foregoing embodiment receives a supply voltage VDD, and doubles the voltage to a voltage (2VDD) as a boosted supply voltage, yielding a voltage boost increment which is equal to VDD (=5[V]) with respect to the supply voltage VDD. The increment may be changed to a different amount, however.

Figure 17:
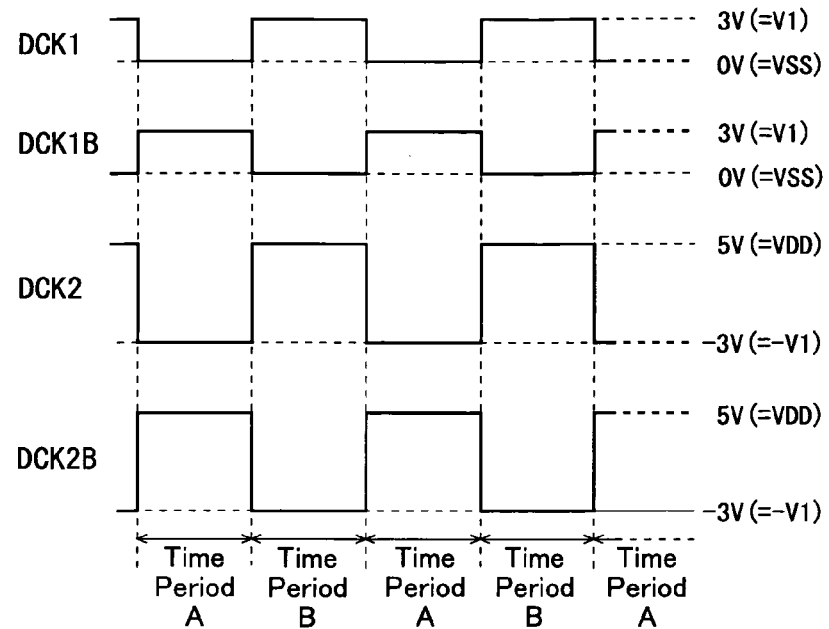
FIG. 17 is a signal waveform chart for describing a second variation of the embodiment.

As understood from FIG. 9 and FIG. 10 which show the operation of the booster section 11a in the positive-side power supply circuit 11, the voltage boost increment is the amplitude of the first and the second clock signals DCK1, DCK1B. Therefore, if the supply voltage VDD is 5[V] and the desired boosted supply voltage is 8[V] for example, a required increment of voltage boost is 3[V], and so the first and the second clock signal DCK1, DCK1B should simply be changed to have an amplitude of 3[V]. In other words, the first and the second clock signals DCK1, DCK1B generated externally will have waveforms as shown in FIG. 17, and these first and second clock signals DCK1, DCK1B will be supplied to the first and the second input terminals Ti1, Ti2 of the power supply circuit which has a configuration as shown in FIG. 1, FIG. 3 and FIG. 4 (Hereinafter, such a power supply circuit will be called "second variation").

Figure 19:
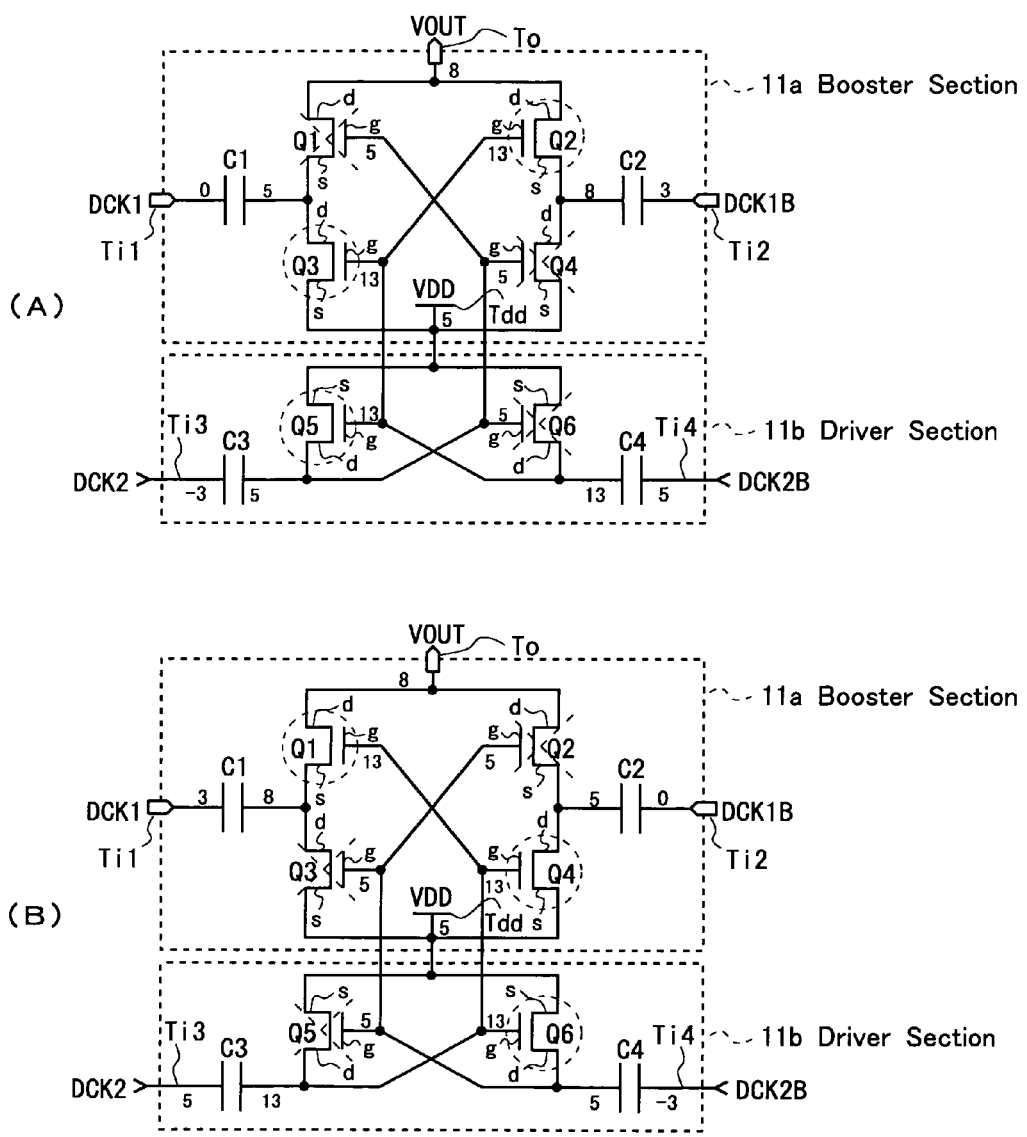
FIG. 19 consists of two figures (A and B) which show an operation of a positive-side power supply circuit in the second variation.

FIG. 19 shows an operation of the positive-side power supply circuit 11 in the second variation. In a steady operation of the second variation, the positive-side power supply circuit 11 repeats an operation state shown in FIG. 19(A) and an operation state shown in FIG. 19(B) alternately to each other. FIG. 19(A) is an operation state in Time Period A shown in FIG. 17, and corresponds to the sixth operation state (FIG. 10) of the positive-side power supply circuit 11 (FIG. 10) in the foregoing embodiment. FIG. 19(B) is an operation state in Time Period B in FIG. 17, and corresponds to the fifth operation state (FIG. 9) of the positive-side power supply circuit 11 in the foregoing embodiment.

Figure 20:
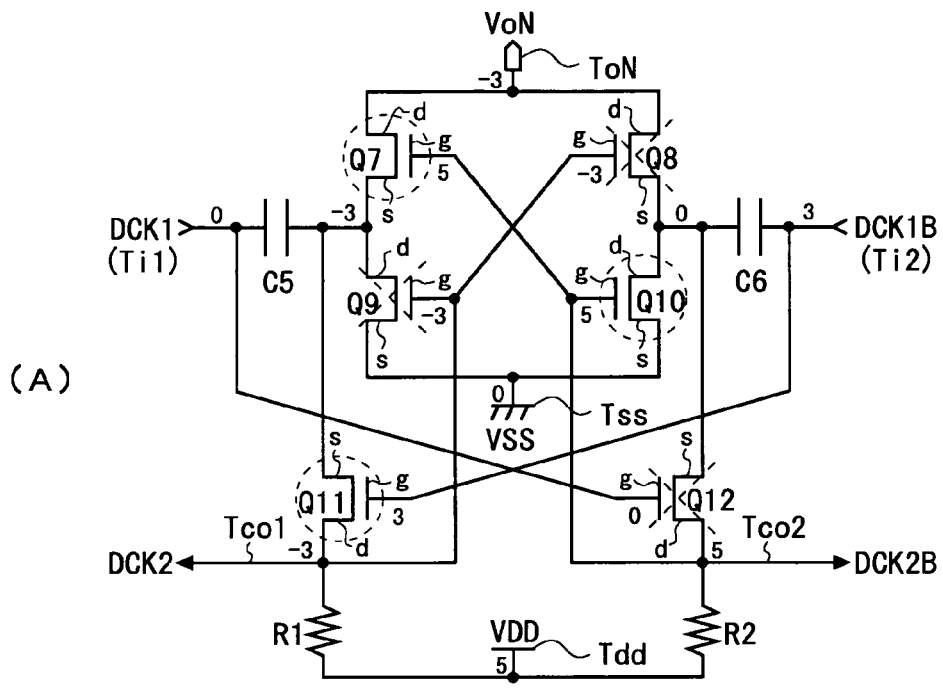
FIG. 20 consists of two figures (A and B) which show an operation of a negative-side power supply circuit in the second variation.
Figure 20:
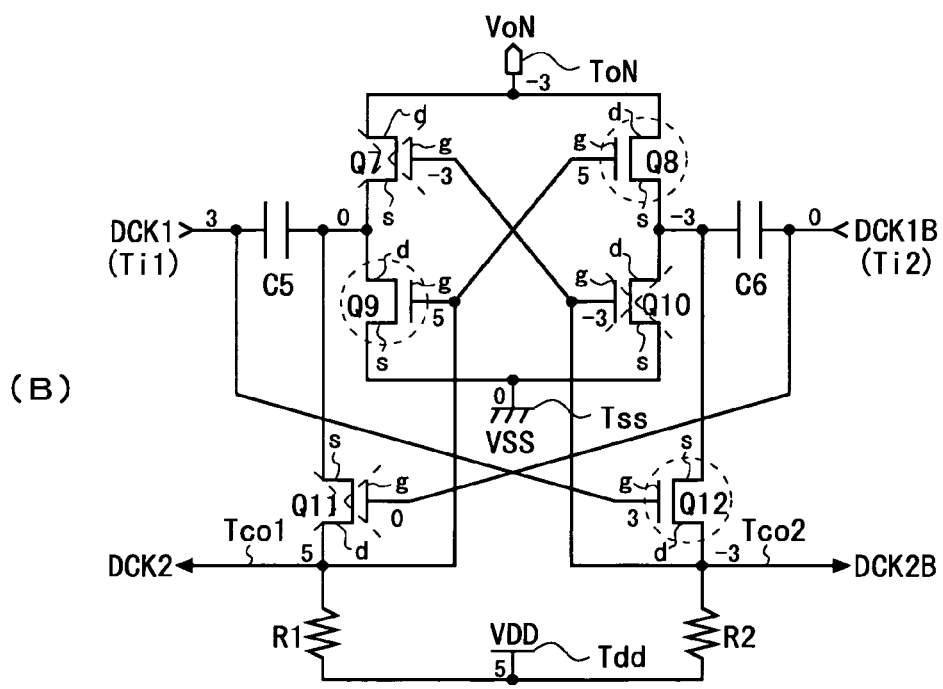

FIG. 20 shows an operation of the negative-side power supply circuit 12 in the second variation as described above. In a steady operation of the second variation, the negative-side power supply circuit 12 repeats an operation state shown in FIG. 20(A) and an operation state shown in FIG. 20(B) alternately to each other. FIG. 20(A) is an operation state in Time Period A given in FIG. 17, and corresponds to the fourth operation state (FIG. 14) of the negative-side power supply circuit 12 in the foregoing embodiment. Also, FIG. 20(B) is the operation state in Time Period B given in FIG. 17, and corresponds to the fifth operation state (FIG. 15) of the negative-side power supply circuit 12 in the foregoing embodiment.

As understood from FIG. 19 and FIG. 20, the second variation differs from the foregoing embodiment in voltage values at each node in the positive-side power supply circuit 11 as well as in the negative-side power supply circuit 12. In the negative-side power supply circuit 12, two pulse signals as shown in FIG. 17, each having an alternating voltage oppositely to each other between −3[V] and 5[V] are generated as the third and the fourth clock signals DCK2, DCK2B. Meanwhile, as shown in FIG. 19, the positive-side power supply circuit 11 utilizes these third and fourth clock signals DCK2, DCK2B as well as the first and the second clock signals DCK1, DCK1B which have a 3[V] amplitude, to generate an 8[V] voltage as a boosted supply voltage VOUT. In this process, those of the N-ch transistors Q1 through Q4 which should assume ON state have their gate terminals (g) supplied with 13[V]. Since the boosted voltage has 8[V], there is no voltage drop by threshold value.

With the arrangement as described, it is possible to boost the supply voltage VDD without a voltage drop by threshold value even if the incremental amount of boost is different from VDD=5[V] which was the value in the foregoing embodiment.

<5.3 Other Variations>

As understood from the description given above for the operation of the positive-side power supply circuit 11 (see FIG. 19 for example), the booster section 11a gives the supply voltage VDD to the first terminal of the charging capacitor C1 or of the C2, via an input-side switching element which is provided by the N-ch transistor Q3 or Q4, and thereafter, the second terminal of this charging capacitor C1 or C2 is given the first or the second clock signal DCK1 or DCK1B, to obtain a voltage (VDD+A1) which is the supply voltage VDD boosted by the amount of amplitude (which is indicated by A1) of the first or the second clock signal DCK1 or DCK1B. The boosted voltage (VDD+A1) is outputted, via the output-side switching element which is provided by the N-ch transistor Q1 or Q2, from the output terminal To as a boosted supply voltage VOUT=(VDD+A1).

Therefore, the first and the second clock signals DCK1, DCK1B which must be supplied externally to the first and the second input terminals Ti1, Ti2 are not limited to those in FIG. 2 or FIG. 17, but may be any pulse signals if they have an amplitude desired as an incremental amount of boost, i.e. a difference (VOUT−VDD) between a desired boosted supply voltage VOUT and the supply voltage VDD. If, however, the booster section 11a is configured as shown in FIG. 3, i.e. for a boosting operation in a complementary manner, the first clock signal DCK1 and the second clock signal DCK1B must be signals each having an alternating voltage oppositely to each other (see FIG. 2 or FIG. 17).

Using the symbol A1 as the amplitude of the first and the second clock signals DCK1, DCK1B as described above, the two pulse signals generated in the negative-side power supply circuit 12 (or the level shifter 12a) as shown in FIG. 4 as the third and the fourth clock signals DCK2, DCK2B to be respectively supplied to the third and the fourth input terminals Ti3, Ti4 of the driver section 11b in the positive-side power supply circuit 11 are expressed as signals each having an alternating voltage oppositely to each other between the supply voltage VDD and a negative voltage (−A1) which has the same absolute value as the amplitude A1. In this case, the driver section 11b in the positive-side power supply circuit 11 generates: a voltage (2VDD+A1), which is higher than the supply voltage VDD by the amount of amplitude (VDD+A1) of the third and the fourth clock signals DCK2, DCK2B, as the first and the second switching control signals CG1, CG2 for turning ON the N-ch transistors Q1 through Q4 serving as the switching elements in the booster section 11a; and also generates a voltage which is equal to the supply voltage VDD, as the first and the second switching control signals CG1, CG2 for turning OFF the N-ch transistors Q1 through Q4. Therefore, when whichever of the N-ch transistors Q1 and Q2 serving as the output-side switching element in the booster section 11a is turned ON, the transistor has its gate terminal (g) supplied with a voltage which is higher than the boosted voltage (VDD+A1) by the amount of the supply voltage VDD. Since the supply voltage VDD is higher than the threshold voltage Vth of the N-ch transistors Q1, Q2, there is no voltage drop by threshold value.

Hence, according to the power supply circuit which has a configuration shown in FIG. 1 or FIG. 16, it is possible, by externally supplying the first and the second clock signals DCK1, DCK1B as pulse signals which have an amplitude equal to a desired amount of boost, to output a desired boosted supply voltage from the output terminal To, with switching elements provided solely by N-channel transistors, without causing a voltage drop by threshold value.

Figure 18:
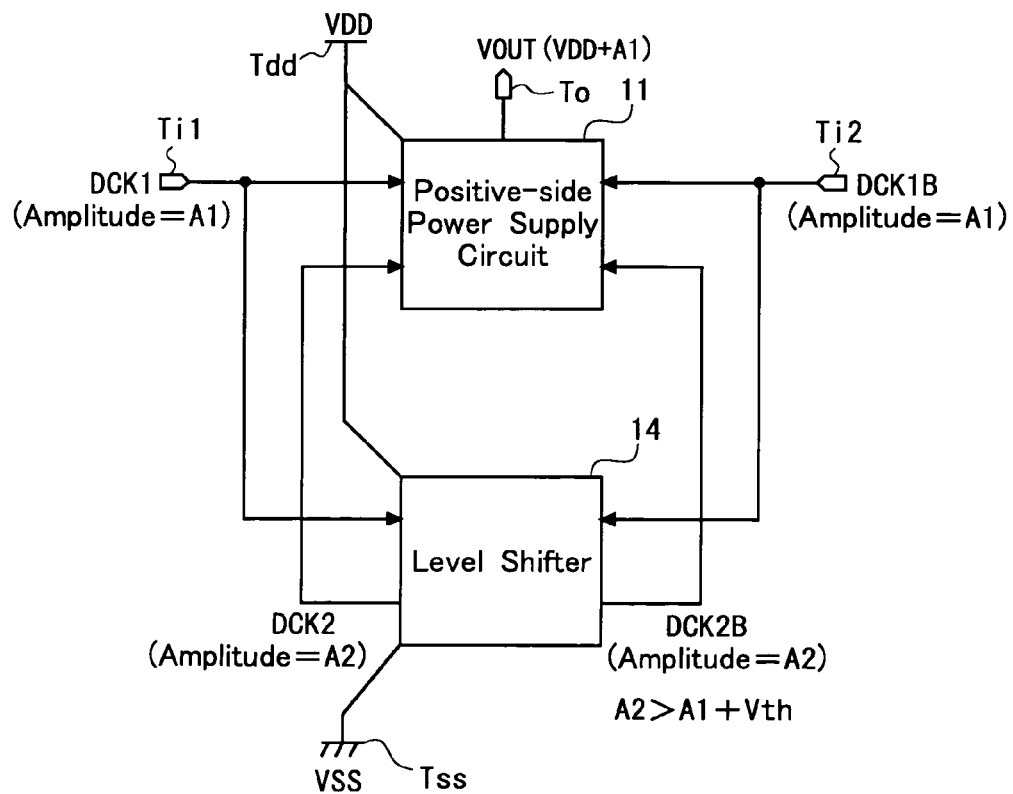
FIG. 18 is a block diagram which shows a configuration of another variation of the embodiment.

The negative-side power supply circuit 12 or the level shifter 12a is not limited to the one shown in FIG. 4; a more general example is shown in FIG. 18 where the negative-side power supply circuit 12 or the level shifter 12a is replaced by a level shifter 14 which generates the third and the fourth clock signals DCK2, DCK2B that have a greater amplitude A2 than the amplitude A1 of the first and the second clock signals DCK1, DCK1B by at least the threshold voltage Vth. In other words, the level shifter 14 externally receives the first and the second clock signals DCK1, DCK1B which have an amplitude A1, performs a level conversion into two pulse signals whose amplitude A2 is greater than A1+Vth, and outputs these two pulse signals as the third and the fourth clock signals DCK2, DCK2B. There is no voltage drop by threshold value in this case, either, since the output-side switching elements in the positive-side power supply circuit 11, i.e. the N-ch transistors Q1, Q2 have their gate terminals (g) supplied with a voltage of VDD+A2(>VDD+A1+Vth) when they are turned ON, whereas the boosted supply voltage is VDD+A1.

It should be noted here that in cases where the configuration shown in FIG. 18 has its first and second input terminals Ti1, Ti2 externally supplied with the first and the second clock signals which are two pulse signals each having a voltage alternating oppositely to each other between the grounding voltage VSS (=0) and the supply voltage VDD (>0), only a single external supply voltage VDD is enough to obtain a boosted supply voltage VOUT(=2VDD). In this case, the third and the fourth clock signals DCK2, DCK2B outputted by the level shifter 14 have an amplitude A2 which is greater than VDD+Vth. The output-side switching elements in the positive-side power supply circuit 11, i.e. the N-ch transistors Q1, Q2, have their gate terminals (g) supplied with a voltage of VDD+A2 (>2VDD+Vth), whereas the boosted supply voltage is 2VDD. Therefore, there is no voltage drop by threshold value in this case, either.

In the above-described embodiment and variations, the booster section 11a makes a voltage boosting operation in a complementary manner (FIG. 3, etc.) However, the present invention is not limited to such a configuration; the present invention requires an arrangement which includes a charge-pumping configuration for boosting a supply voltage, with at least one charging capacitor which has a terminal connected with an input-side and an output-side switching elements each provided by an N-channel transistor. Further, in cases where the third and the fourth clock signals DCK2, DCK2B as described earlier (FIG. 2, FIG. 17 and FIG. 18) are available externally, the negative-side power supply circuit 12 (or the level shifter 12a) may be eliminated and the voltage-boosting power supply circuit may be constructed only with the positive-side power supply circuit 11 described earlier.

<6. Application to Driver Monolithic Display Devices>

Figure 21:
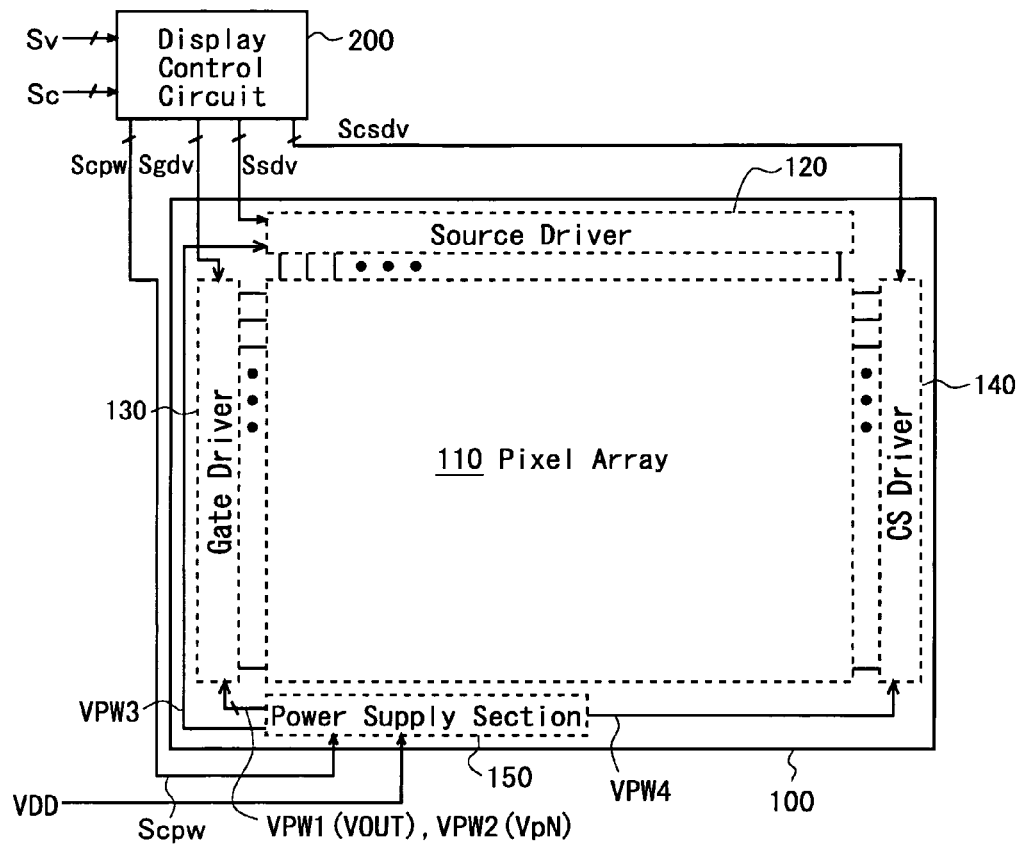
FIG. 21 is a block diagram which shows a configuration of a driver monolithic liquid crystal display device including a power supply circuit according to the embodiment.

Next, description will cover a case where a power supply circuit according to the present invention is utilized in a liquid crystal display device. FIG. 21 is a block diagram which shows a configuration of such a liquid crystal display device. This liquid crystal display device is a driver monolithic display device which includes a liquid crystal panel 100 and a display control circuit 200. The liquid crystal panel 100 has a TFT substrate and an opposed substrate sandwiching a liquid crystal layer therebetween.

The TFT substrate in the liquid crystal panel 100 includes an insulated substrate made of glass for example, which is formed thereon with a plurality of data signal lines and a plurality of scanning signal lines crossing therewith in a grid pattern. Each of the scanning signal lines are paralleled by an auxiliary capacity line serving as an auxiliary electrode. A plurality of pixel circuits (pixel formation portions) each corresponding to one of the intersections made by the data signal lines and the scanning signal lines are formed in a matrix pattern (Hereinafter, these pixel circuits formed in a matrix pattern will be called "pixel array"). The TFT substrate further includes a source driver 120 as a data signal line drive circuit, a gate driver 130 as a scanning signal line drive circuit, a CS driver 140 as an auxiliary capacity line drive circuit, and a power supply section 150 which includes a power supply circuit (FIG. 1) according to the foregoing embodiment. These source driver 120, gate driver 130, CS driver 140 and power supply section 150 are formed simultaneously in a process of forming the pixel circuits. Note that switching elements and other active elements formed to build the above-mentioned drive circuits 120 through 140 and power supply section 150 on the liquid crystal panel 100 are solely provided by N-channel TFTs formed of a polycrystal silicon.

The opposed substrate in the liquid crystal panel 100 is an insulated transparent substrate made of glass for example, which has a surface entirely formed thereon with a layer of a common electrode Ecom and a layer of an alignment film laminated thereon.

Figure 22:
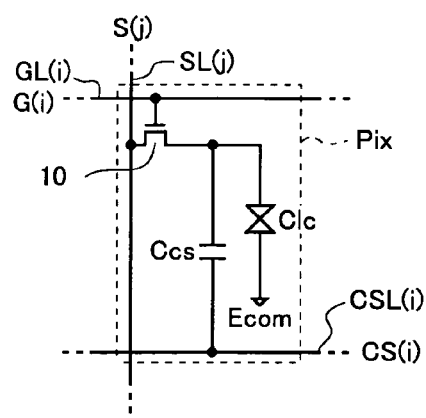
FIG. 22 is a circuit diagram which shows an electric configuration of a pixel formation portion in the driver monolithic liquid crystal display device.
Figure 23:
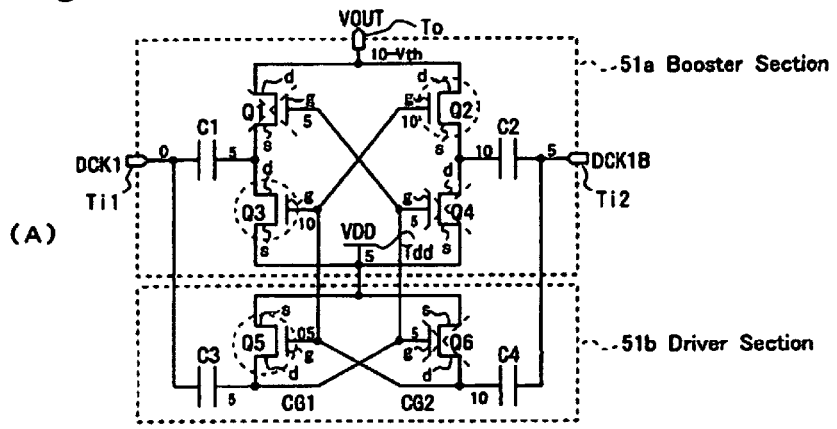
FIG. 23 consists of two circuit diagrams (A and B) which show a configuration and an operation of a conventional charge-pumping power supply circuit.
Figure 23:
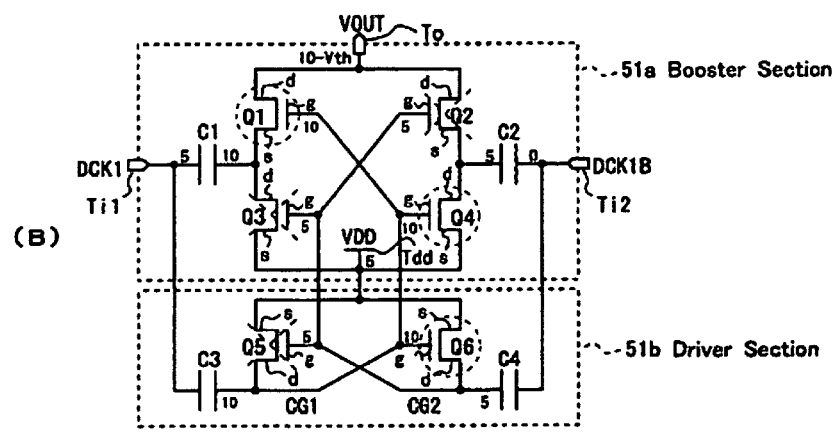
Figure 24:
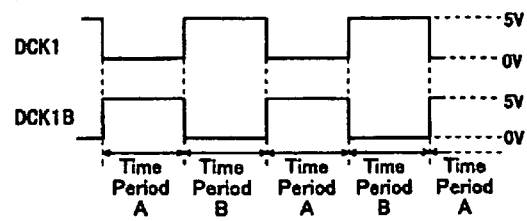
FIG. 24 is a waveform chart of clock signals for driving the conventional power supply circuit.

FIG. 22 is a circuit diagram which shows an electric configuration of a pixel formation portion Pix for framing a pixel required to display an intended image in the liquid crystal panel 100. Each pixel formation portion Pix is constituted by one of the pixel circuits in the pixel array 110, and common elements, i.e. the liquid crystal layer and the common electrode Ecom which are formed commonly to all of the pixel circuits. Electrically, each pixel formation portion Pix has a configuration shown in FIG. 22, including: a switching element provided by an N-channel TFT 10 having a source terminal connected with a corresponding one of the data signal lines SL(j) and a gate terminal connected with a corresponding one of the scanning signal lines GL(i); a liquid crystal capacity Clc formed by a pixel electrode connected with a drain terminal of the TFT 10, the liquid crystal layer and the common electrode Ecom; and an auxiliary capacity Ccs formed by the pixel electrode and the auxiliary capacity line CSL(i) which corresponds to the scanning signal line GL(i).

The display control circuit 200 generates the following signals based on an image signal Sv and a control signal Sc supplied from an external signal source (not illustrated): a drive control signal (including image signals for supplying each pixel electrode with a voltage which indicates a pixel value) Ssdv for operation of the source driver 120; a drive control signal Sgdv for operation of the gate driver 130; a drive control signal Scsdv for operation of the CS driver 140; and a power supply control signal Scpw which contains a clock signal to be described later and other signals for operation of the power supply section 150. The display control circuit 200 also generates a signal for operation of a common electrode drive circuit (not illustrated) which generates a common voltage Vcom for driving the common electrode Ecom.

Based on the drive control signal Sgdv, the gate driver 130 generates scanning signals G(1) through G(m) (a letter m indicates the quantity of scanning signal lines) and applies the generated signals to the scanning signal lines so that the scanning signal lines will be sequentially supplied with a voltage for turning ON the TFTs 10. The source driver 120 generates data signals S(1) through S(n) and applies the generated signals to the data signal lines for displaying an image in the liquid crystal panel 100, based on the drive control signals Ssdv. The CS driver 140 generates CS signals CS(1) through CS(m) and applies the generated signals to the auxiliary capacity lines for a control of pixel electrode potential via the auxiliary capacity Ccs, based on the drive control signals Scsdv.

The power supply section 150 generates, based on the power supply control signal Scpw and from a supply voltage VDD (not illustrated) supplied to the liquid crystal panel 100, power supply voltages VPW1, VPW2 to be supplied to the gate driver 130, a power supply voltage VPW3 to be supplied to the source driver 120, and a supply voltage VPW4 to be supplied to the CS driver 140. As described earlier, the power supply section 150 includes a power supply circuit (FIG. 1) according to the foregoing embodiment. The power supply circuit thus includes a positive-side power supply circuit 11 and a negative-side power supply circuit 12 which output a boosted supply voltage VOUT and a negative supply voltage VpN respectively, and these outputs are supplied as the supply voltages VPW1, VPW2 to the gate driver 130. The other supply voltages VPW3, VPW4 are generated by a power supply circuit according to a variation (of the foregoing embodiment) shown in FIG. 18. In cases where VPW3 and VPW4 have the same voltage as VPW1, the output VOUT from the positive-side power supply circuit 11 may be supplied as VPW1, VPW3 and VPW4 to the gate driver 130, the source driver 120 and the CS driver 140 respectively.

According to the driver monolithic liquid crystal display device as described above, switching elements and other active elements in the pixel array 110, the source driver 120, the gate driver 130, and the CS driver 140, are solely provided by N-channel TFTs, and no P-channel TFTs are utilized. Therefore, it is possible to reduce cost by employing a simpler process of manufacture than in cases where both of the N-channel TFTs and the P-channel TFTs are utilized. Further, since the power supply section 150 includes a power supply circuit according to the foregoing embodiment or a variation thereof, there is no voltage drop by the threshold value when generating the supply voltages VPW1 through VPW4 for supplying to the source driver 120, the gate driver 130 and the CS driver 140. As a note, in the liquid crystal display device illustrated in FIG. 21, the power supply section 150 is implemented with the use of TFTs which are made of a polycrystal silicon. When compared to cases where the TFTs are made of a monocrystal silicon, the switching elements provided by these N-channel transistors (TFTs) have a larger threshold value and the threshold value varies in a wider range, yet the circuit device is capable of providing a stable voltage boosting operation and outputting a desired boosted supply voltage reliably since there is no voltage drop by threshold value as described above.

INDUSTRIAL APPLICABILITY

The present invention is applicable to power supply circuits which include a charge-pumping booster section for boosting a supply voltage, and to driver monolithic display devices which include such a power supply circuit.

The invention claimed is:

1. A charge-pumping power supply circuit for boosting an input supply voltage from outside, comprising:
a booster section including a charging capacitor and an input-side and an output-side switching elements connected with a first terminal of the charging capacitor, for boosting a voltage supplied to the charging capacitor via the input-side switching element and outputting a boosted voltage as a boosted supply voltage via the output-side switching element;
a driver section for generating control signals for the input-side and the output-side switching elements to turn on and off oppositely to each other; and
a level shifter supplied with a first clock signal and a second clock signal each having a same amplitude as the other and a voltage alternating oppositely to each other, for respectively converting the first and second clock signals into a third clock signal and a fourth clock signal each having a greater amplitude than the first and second clock signals by at least the threshold voltage,
wherein each of the input-side and the output-side switching elements is provided by an N-channel transistor of a positive threshold voltage,
wherein the driver section generates the control signals so that the control signal for the output-side switching element to turn on has a voltage higher than the boosted voltage by at least the threshold voltage,
wherein the charging capacitor has a second terminal supplied with the first clock signal, and
wherein the driver section generates, based on the third and the fourth clock signals, two respective pulse signals each having a same phase as the first and the second clock signals and a voltage alternating oppositely to each other between the input supply voltage and a voltage which is greater than the input supply voltage by the amplitude of the third and the fourth clock signals, as a first and a second switching control signals constituting the control signals.

2. The power supply circuit according to claim 1, wherein the switching elements in the booster section and the driver section are made of a polycrystal silicon.

3. The power supply circuit according to claim 1, wherein the switching elements in the booster section and the driver section are provided by N-channel thin film transistors.

4. A driver monolithic display device, in which a plurality of pixel circuits for formation of an image intended to display and at least part of a circuit for driving the pixel circuits are both formed on one substrate, the display device comprising:
a display section including the pixel circuits;
the power supply circuit according to claim 1; and
a drive circuit which receives the boosted supply voltage from the power supply circuit and drives the display section;
wherein the substrate is formed thereon with the pixel circuits, at least part of the drive circuit and the power supply circuit.

5. The driver monolithic display device according to claim 4, wherein switching elements in the pixel circuits, said at least part of the drive circuit and the power supply circuit formed on the substrate are each provided by an N-channel thin film transistor.

6. A charge-pumping power supply circuit for boosting an input supply voltage from outside, comprising:
a booster section including a charging capacitor and an input-side and an output-side switching elements connected with a first terminal of the charging capacitor, for boosting a voltage supplied to the charging capacitor via the input-side switching element and outputting a boosted voltage as a boosted supply voltage via the output-side switching element; and
a driver section for generating control signals for the input-side and the output-side switching elements to turn on and off oppositely to each other,
wherein each of the input-side and the output-side switching elements is provided by an N-channel transistor of a positive threshold voltage, and
wherein the driver section generates the control signals so that the control signal for the output-side switching element to turn on has a voltage higher than the boosted voltage by at least the threshold voltage, wherein
the booster section includes:
a power supply terminal for receiving the input supply voltage;
a first input terminal and a second input terminal for respectively receiving a first clock signal and a second clock signal each having a same amplitude as the other and a voltage alternating oppositely to each other;
an output terminal for outputting the boosted supply voltage;
a first switching element and a second switching element each serving as the output-side switching element which is provided by an N-channel transistor;
a third switching element and a fourth switching element each serving as the input-side switching element which is provided by an N-channel transistor;
a first capacitor serving as the charging capacitor, having a first terminal connected with the power supply terminal via the third switching element as well as with the output terminal via the first switching element, and a second terminal connected with the first input terminal; and
a second capacitor serving as the charging capacitor, having a first terminal connected with the power supply terminal via the fourth switching element as well as with the output terminal via the second switching element, and a second terminal connected with the second input terminal; and
the driver section includes:
a third input terminal and a fourth input terminal for respectively receiving a third clock signal and a fourth clock signal each having a same amplitude as the other and a voltage alternating oppositely to each other;
a fifth switching element and a sixth switching element provided by N-channel transistors;
a third capacitor having a first terminal connected with the power supply terminal via the fifth switching element as well as with a control terminal of the sixth switching element, and a second terminal connected with the third input terminal; and
a fourth capacitor having a first terminal connected with the power supply terminal via the sixth switching element as well as with a control terminal of the fifth switching element, and a second terminal connected with the fourth input terminal;
wherein a voltage at the first terminal of the third capacitor is supplied to control terminals of the first and the fourth switching elements as a first switching control signal constituting the control signals,
a voltage at the first terminal of the fourth capacitor being supplied to control terminals of the second and the third switching elements as a second switching control signal constituting the control signals.

7. The power supply circuit according to claim 6, further comprising a level shifter for converting the first and the second clock signals into respective clock signals each having a greater amplitude than the respective first and second clock signals by at least the threshold voltage, the level shifter outputting the converted clock signals as the third and the fourth clock signals.

8. The power supply circuit according to claim 7, wherein the level shifter converts the first and the second clock signals into respective clock signals each having a voltage alternating oppositely to each other between a negative voltage and a positive voltage each having a same absolute value as the amplitude of first and second clock signals with respect to a grounding voltage as a reference potential for the input supply voltage, the level shifter outputting the converted clock signals as the third and the fourth clock signals,
the first and the second clock signals each having a voltage alternating between the input supply voltage and the grounding voltage,
the third and the fourth clock signals each having a voltage alternating between a negative voltage and a positive voltage each having a same absolute value as the input supply voltage.

9. The power supply circuit according to claim 8, further comprising a negative-side power supply circuit including the level shifter, for outputting as a negative supply voltage a negative voltage which has a same absolute value as the input supply voltage,
the negative-side power supply circuit including:
a grounding terminal for receiving the grounding voltage;
a negative output terminal for outputting the negative supply voltage;
a first and a second clock output terminals;
seventh through twelfth switching elements provided by N-channel transistors;

a fifth capacitor having a first terminal connected with the grounding terminal via the ninth switching element, as well as with the negative output terminal via the seventh switching element, and with the first clock output terminal via the eleventh switching element; and a second terminal connected with the first input terminal and with a control terminal of the twelfth switching element;

a sixth capacitor having a first terminal connected with the grounding terminal via the tenth switching element, as well as with the negative output terminal via the eighth switching element, and with the second clock output terminal via the twelfth switching element; and a second terminal connected with the second input terminal and with a control terminal of the eleventh switching element;

a first resistive element having a first terminal connected with the first clock output terminal, a control terminal of the eighth switching element and a control terminal of the ninth switching element; and a second terminal connected with the power supply terminal; and a second resistive element having a first terminal connected with the second clock output terminal, a control terminal of the seventh switching element, and a control terminal of the tenth switching element; and a second terminal connected with the power supply terminal;

the ninth, the tenth, the eleventh and the twelfth switching elements, the fifth and the sixth capacitors, and the first and the second resistive elements constituting the level shifter, voltages at the first and the second clock output terminals being supplied to the third and the fourth input terminals as the third and the fourth clock signals respectively.

10. The power supply circuit according to claim 6, wherein the switching elements in the booster section and the driver section are made of a polycrystal silicon.

11. The power supply circuit according to claim 6, wherein the switching elements in the booster section and the driver section are provided by N-channel thin film transistors.

12. A driver monolithic display device, in which a plurality of pixel circuits for formation of an image intended to display and at least part of a circuit for driving the pixel circuits are both formed on one substrate, the display device comprising:

a display section including the pixel circuits;

a power supply circuit according to claim 6; and a drive circuit which receives the boosted supply voltage from the power supply circuit and drives the display section;

wherein the substrate is formed thereon with the pixel circuits, at least part of the drive circuit and the power supply circuit.

13. The driver monolithic display device according to claim 12, wherein switching elements in the pixel circuits, said at least part of the drive circuit and the power supply circuit formed on the substrate are each provided by an N-channel thin film transistor.

* * * * *